US011977345B2

(12) United States Patent
Taguchi et al.

(10) Patent No.: US 11,977,345 B2
(45) Date of Patent: May 7, 2024

(54) DEVICE INCLUDING ROTATOR AND BELT, SUCH AS A FIXING DEVICE FOR AN IMAGE FORMING APPARATUS

(71) Applicant: BROTHER KOGYO KABUSHIKI KAISHA, Nagoya (JP)

(72) Inventors: Kazuna Taguchi, Nagoya (JP); Hiroshi Handa, Inazawa (JP); Shuhei Fukue, Nagoya (JP); Tomonori Watanabe, Ichinomiya (JP); Kenji Takeuchi, Nagoya (JP); Tatsuo Ogasawara, Kasugai (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/187,960

(22) Filed: Mar. 1, 2021

(65) Prior Publication Data

US 2021/0181662 A1 Jun. 17, 2021

Related U.S. Application Data

(63) Continuation of application No. 16/729,586, filed on Dec. 30, 2019, now Pat. No. 10,942,478.

(30) Foreign Application Priority Data

Mar. 28, 2019 (JP) ................................ 2019-062903
Mar. 28, 2019 (JP) ................................ 2019-062907

(51) Int. Cl.
*G03G 15/20* (2006.01)

(52) U.S. Cl.
CPC . *G03G 15/2053* (2013.01); *G03G 2215/2035* (2013.01)

(58) Field of Classification Search
CPC .......... G03G 2215/2035; G03G 5/206; G03G 15/206
See application file for complete search history.

(56) References Cited

U.S. PATENT DOCUMENTS 8,983,352 B2 3/2015 Sasaki
9,411,273 B1 8/2016 Takahashi
(Continued)

FOREIGN PATENT DOCUMENTS

JP 60-198575 A 10/1985
JP 8-44225 A 2/1996
(Continued)

OTHER PUBLICATIONS

Office Action {Notice of Reasons for Refusal} issued in corresponding Japanese Patent Application No. 2019-062903, Feb. 7, 2023.
(Continued)

*Primary Examiner* — Arlene Heredia
(74) *Attorney, Agent, or Firm* — Merchant & Gould P.C.

(57) ABSTRACT

A device includes a rotator having a rotation axis, a belt, a nip forming member surrounded by the belt, a holder holding the nip forming member, a first stay supporting the holder, an urging member urging the first stay toward the rotator, a second stay, and a connector. The nip forming member is configured to, with the rotator, pinch the belt to form a nip. The first stay extends in a width direction parallel to the rotation axis. The second stay is positioned upstream of the first stay in a moving direction of the belt at the nip. The moving direction is perpendicular to the width direction. The connector extends through at least one of the first stay and the second stay to connect the first stay to the second stay.

19 Claims, 15 Drawing Sheets

(56) References Cited

U.S. PATENT DOCUMENTS

| | | | | |
|---|---|---|---|---|
| 9,835,996 | B2 * | 12/2017 | Nagai .................. | G03G 15/206 |
| 10,365,596 | B1 * | 7/2019 | Tanaka ................. | G03G 15/206 |
| 10,386,759 | B2 * | 8/2019 | Endo .................. | G03G 15/0849 |
| 10,539,911 | B1 * | 1/2020 | Imazu ................ | G03G 15/2053 |
| 2008/0205924 | A1 | 8/2008 | Fujimoto | |
| 2009/0226227 | A1 | 9/2009 | Furukata et al. | |
| 2015/0078768 | A1 * | 3/2015 | Yamaguchi ........ | G03G 15/2064 399/329 |
| 2017/0255148 | A1 * | 9/2017 | Sato ..................... | G03G 15/206 |

FOREIGN PATENT DOCUMENTS

| | | | |
|---|---|---|---|
| JP | 2002-148985 | A | 5/2002 |
| JP | 2002-372887 | A | 12/2002 |
| JP | 3744347 | B2 | 2/2006 |
| JP | 2008-216280 | A | 9/2008 |
| JP | 2009-216910 | A | 9/2009 |
| JP | 2009-216911 | A | 9/2009 |
| JP | 2010-210912 | A | 9/2010 |
| JP | 2010-230711 | A | 10/2010 |
| JP | 2015-11142 | A | 1/2015 |
| JP | 2015-194785 | A | 11/2015 |
| JP | 2017-107097 | A | 6/2017 |

OTHER PUBLICATIONS

Office Action {Notice of Reasons for Refusal} issued in corresponding Japanese Patent Application No. 2019-062907, Feb. 7, 2023.

* cited by examiner

DEVICE INCLUDING ROTATOR AND BELT, SUCH AS A FIXING DEVICE FOR AN IMAGE FORMING APPARATUS

CROSS-REFERENCE TO RELATED APPLICATION

This application is a continuation of U.S. patent application Ser. No. 16/729,586, filed Dec. 30, 2019, now U.S. Pat. No. 10,942,478, which claims priority from Japanese Patent Application No. 2019-062907, and Japanese Patent Application No. 2019-062903, both of which were filed on Mar. 28, 2019. The contents of the aforementioned applications are incorporated herein by reference in their entirety.

TECHNICAL FIELD

Aspects of the disclosure relate to a fixing device including a rotator and a belt, and an image forming apparatus including the fixing device.

BACKGROUND

A known belt-type fixing device includes a belt, a heat roller and a pad that sandwich therebetween the belt, a holder that supports the pad, and a U-shaped stay that supports the holder. The stay includes two walls and a bend portion connecting the two walls. Each of the two walls is in contact with the holder at its end opposite to the bend portion. Another known belt-type fixing device includes a belt, a heat roller and a pad that sandwich therebetween the belt, an upstream guide disposed upstream from the pad to guide the belt, a downstream guide disposed downstream from the pad to guide the belt, and a stay holding the upstream and downstream guides. The downstream guide is fixed to the stay with screws while the upstream guide is only supported by the stay.

SUMMARY

According to one aspect of the disclosure, a device includes a rotator having a rotation axis, a belt, a nip forming member, a holder, a first stay, an urging member, a second stay, and a connector. The nip forming member is surrounded by the belt. The nip forming member is configured to, with the rotator, pinch the belt to form a nip. The holder holds the nip forming member. The first stay supports the holder. The first stay extends in a width direction parallel to the rotation axis. The urging member urges the first stay toward the rotator. The second stay is positioned upstream of the first stay in a moving direction of the belt at the nip. The moving direction is perpendicular to the width direction. The connector extends through at least one of the first stay and the second stay to connect the first stay to the second stay.

According to another aspect of the disclosure, a device includes a rotator having a rotation axis, a belt, a nip forming member, a holder, a first stay, an urging member, an upstream guide, a downstream guide, and a connector. The nip forming member is surrounded by the belt. The nip forming member is configured to, with the rotator, pinch the belt to form a nip. The holder holds the nip forming member. The first stay supports the holder. The first stay extends in a width direction parallel to the rotation axis. The urging member urges the first stay toward the rotator. The upstream guide is configured to guide an inner peripheral surface of the belt at a position upstream of the nip forming member in a moving direction of the belt at the nip. The moving direction is perpendicular to the width direction. The downstream guide is configured to guide an inner peripheral surface of the belt at a position downstream of the nip forming member in the moving direction. The connector extends in the moving direction between the upstream guide and the downstream guide to connect the upstream guide and the downstream guide to the first stay.

DETAILED DESCRIPTION

An illustrative embodiment will be described with reference to the accompany drawings.

Figure 1:
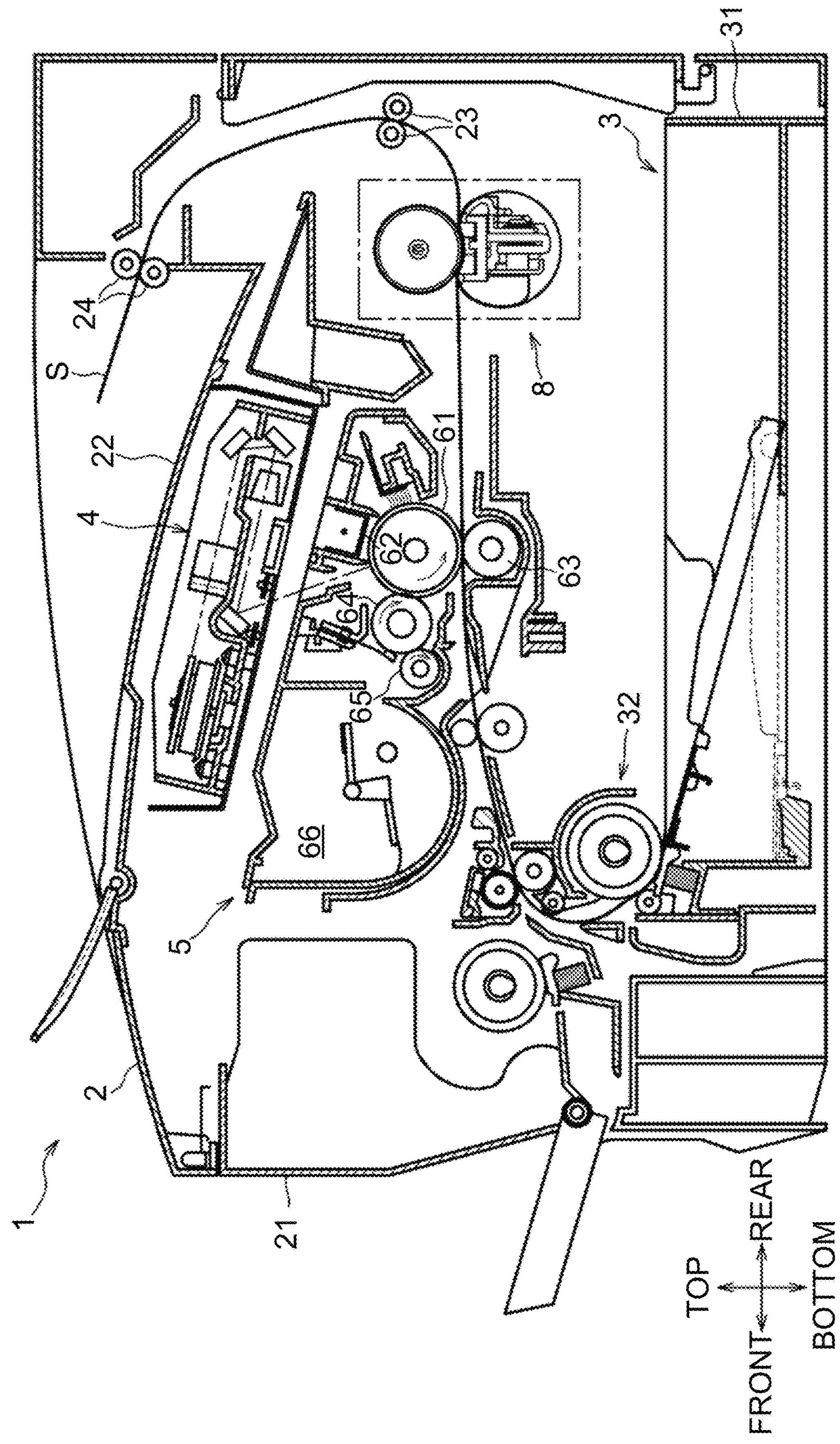
FIG. 1 is a cross sectional view of a laser printer according to an illustrative embodiment of the disclosure.

As illustrated in FIG. 1, an image forming apparatus 1 (e.g., a laser printer) includes a casing 2, a sheet supply unit 3, an exposure device 4, an image forming unit 5, and a fixing device 8.

The sheet supply unit 3 includes a sheet tray 31 for accommodating sheets S (e.g., sheets of paper), and a sheet supply mechanism 32. The sheet supply mechanism 32 supplies a sheet S from the sheet tray 31 toward the image forming unit 5.

The exposure device 4 includes a laser emitter, a polygon mirror, lenses, and reflecting mirrors. The exposure device 4 is configured to expose a surface of a photosensitive drum 61 by scanning thereon at high speed a laser beam (indicated by a dot-and-dash line) emitted from the laser emitter based on image data.

The image forming unit 5 is disposed below the exposure device 4. The image forming unit 5 is constituted as a process cartridge. The image forming unit 5 is removable from the casing 2 through an opening formed when a front cover 21 disposed at a front of the casing 2 is open. The image forming unit 5 includes a photosensitive drum 61, a charger 62, a transfer roller 63, a developing roller 64, a supply roller 65, and a developer chamber 66 configured to store therein developer, for example, dry toner.

In the image forming unit 5, the charger 62 uniformly charges the surface of the photosensitive drum 61. Thereafter, the exposure device 4 exposes the surface of the photosensitive drum 61 to a laser beam, and the surface of the photosensitive drum 61 carries an electrostatic latent image corresponding to image data. The supply roller 65 supplies developer in the developer chamber 66 to the developing roller 64.

The developing roller 64 supplies developer to the electrostatic latent image formed on the surface of the photosensitive drum 61. The electrostatic latent image on the surface of the photosensitive drum 61 is thus visually developed as a developer image. Thereafter, when a sheet S supplied from the sheet supply unit 3 passes through between the photosensitive drum 61 and the transfer roller 63, the developer image is transferred from the photosensitive drum 61 onto the sheet S.

The fixing device 8 is disposed at the rear of the image forming unit 5. An overall structure of the fixing device 8 will be described in detail later. The fixing device 8 thermally fixes the developer image transferred onto a sheet S passing through the fixing device 8. The image forming apparatus 1 uses conveying rollers 23 and discharge rollers 24 to discharge the sheet S having the developer image fixed thereto onto a discharge tray 22.

Figure 2:
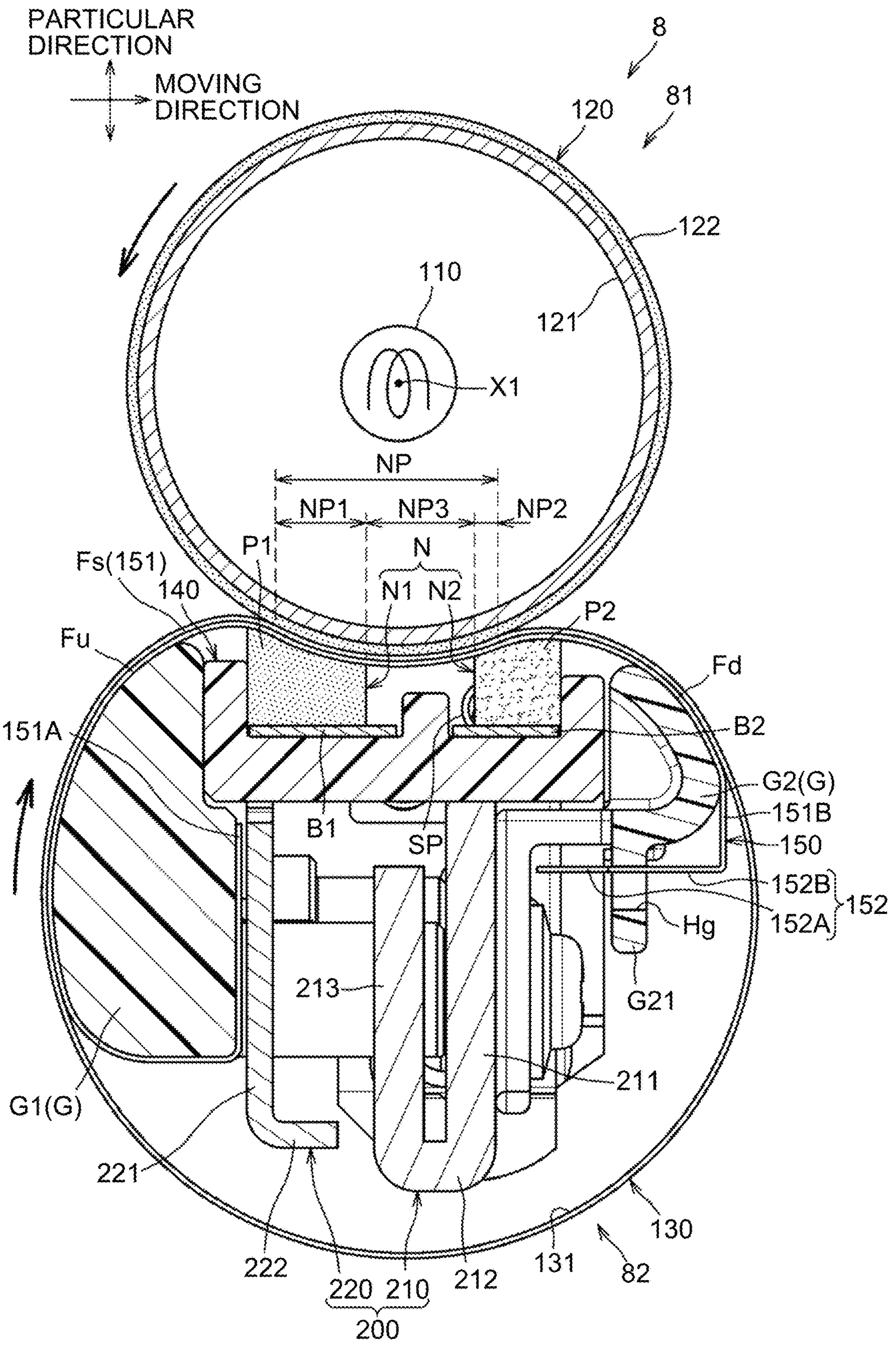
FIG. 2 is a cross sectional view of a fixing device of the image forming apparatus.
Figure 15:
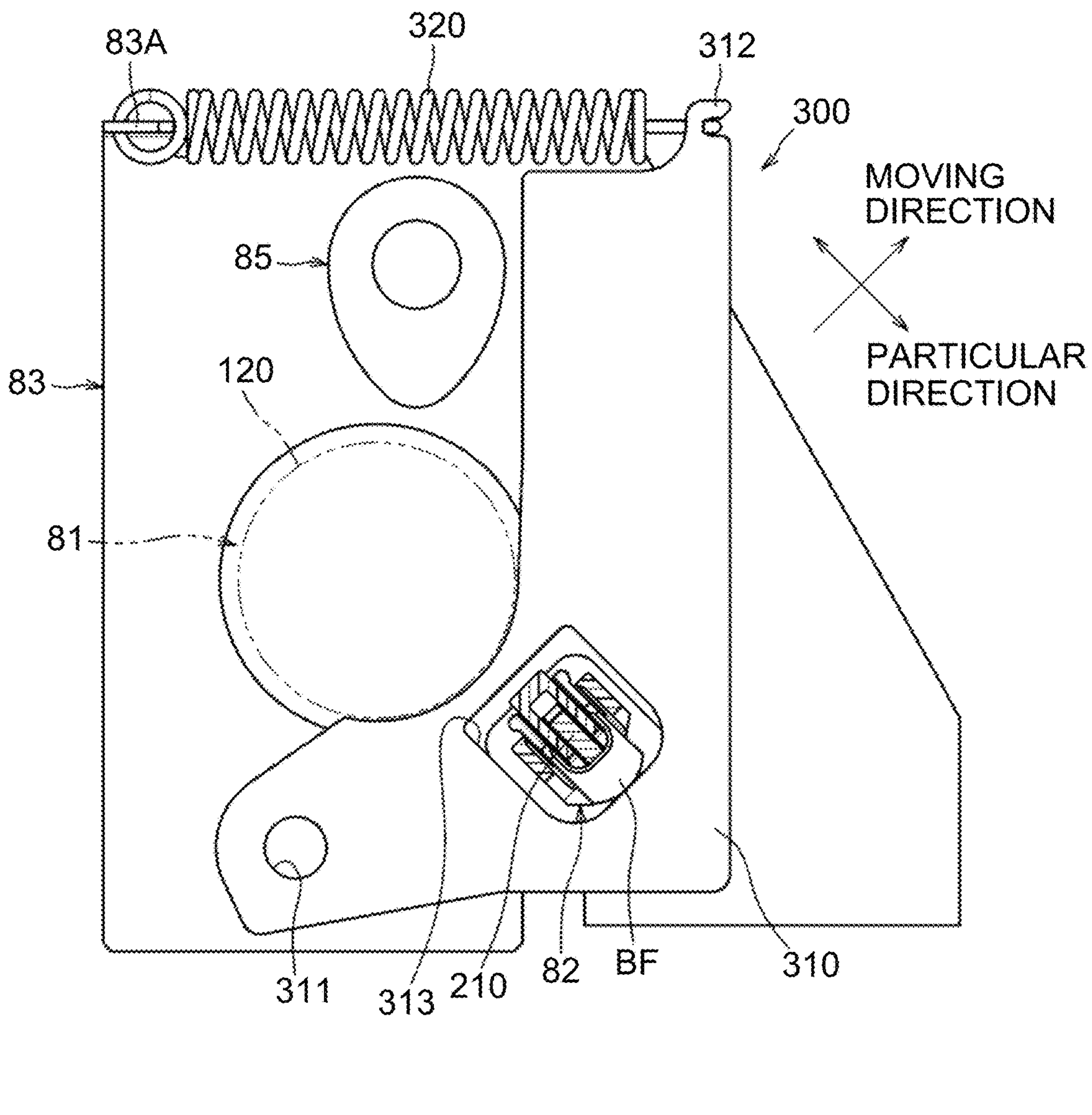
FIG. 15 is a side sectional view of an inner side of the pressure mechanism viewed in the width direction.

As illustrated in FIG. 2, the fixing device 8 includes a heating unit 81 and a pressure unit 82. The pressure unit 82 is urged toward the heating unit 81 by a pressure mechanism 300 (FIG. 15). In the following description, a direction in which the pressure mechanism 300 urges the pressure unit 82 toward the heating unit 81 is referred to as "a particular direction". The particular direction is a direction which is orthogonal to a width direction and a moving direction which will be described later, and in which the heating unit 81 and the pressure unit 82 face to each other.

The heating unit 81 includes a heater 110 and a rotator 120. The pressure unit 82 includes a belt 130, a nip forming member N, a holder 140, a stay 200, a belt guide G, a sliding sheet 150, two springs SP, two buffers BF, five first screw SC1, two second screws SC2, and two third screws SC3. In the following description, a width direction of the belt 130 is referred to as just "a width direction". The width direction extends in an axial direction of the rotator 120. The width direction is orthogonal to the particular direction.

The heater 110 is a halogen lamp and, when turned on, produces light for radiant heat to heat the rotator 120. The heater 110 is disposed within an interior space of the rotator 120 along a rotation axis of the rotator 120.

The rotator 120 is a cylindrical roller extending in the width direction to receive heat from the heater 110. The rotator 120 includes a metal-made tube 121 and an elastic layer 122 covering an outer peripheral surface of the tube 121. The elastic layer 122 is made of rubber such as silicone rubber. The rotator 120 has an outside diameter greater at its both ends in the width direction than its central portion. In other words, the rotator 120 has a concave shape with its outside diameter gradually greater from its central portion toward its both ends. The rotator may have a different shape. For example, the rotator may be a cylindrical roller having a uniform outside diameter in the width direction. Alternatively, the rotator may be a crown-shaped roller having its outside diameter smaller from its central portion toward its both ends in the width direction.

The rotator 120 is rotatably supported by side frames 83 (one of which is illustrated in FIG. 15), which will be described later. The rotator 120 receives a driving force from a motor disposed in the casing 2 to rotate counterclockwise in FIG. 2.

The belt 130 is a flexible, long tubular member. The belt 130 has a base made of, for example, metal and resin, and a releasable layer covering an outer peripheral surface of the base. The belt 130 is in frictional contact with the rotator 120 or a sheet S and rotates clockwise in FIG. 2 with the rotation of the rotator 120. A lubricant, such as grease, is applied to an inner peripheral surface of the belt 130. The nip forming member N, the holder 140, the stay 200, the belt guide G, and the sliding sheet 150 are disposed within an interior space of the belt 130.

Figure 3:
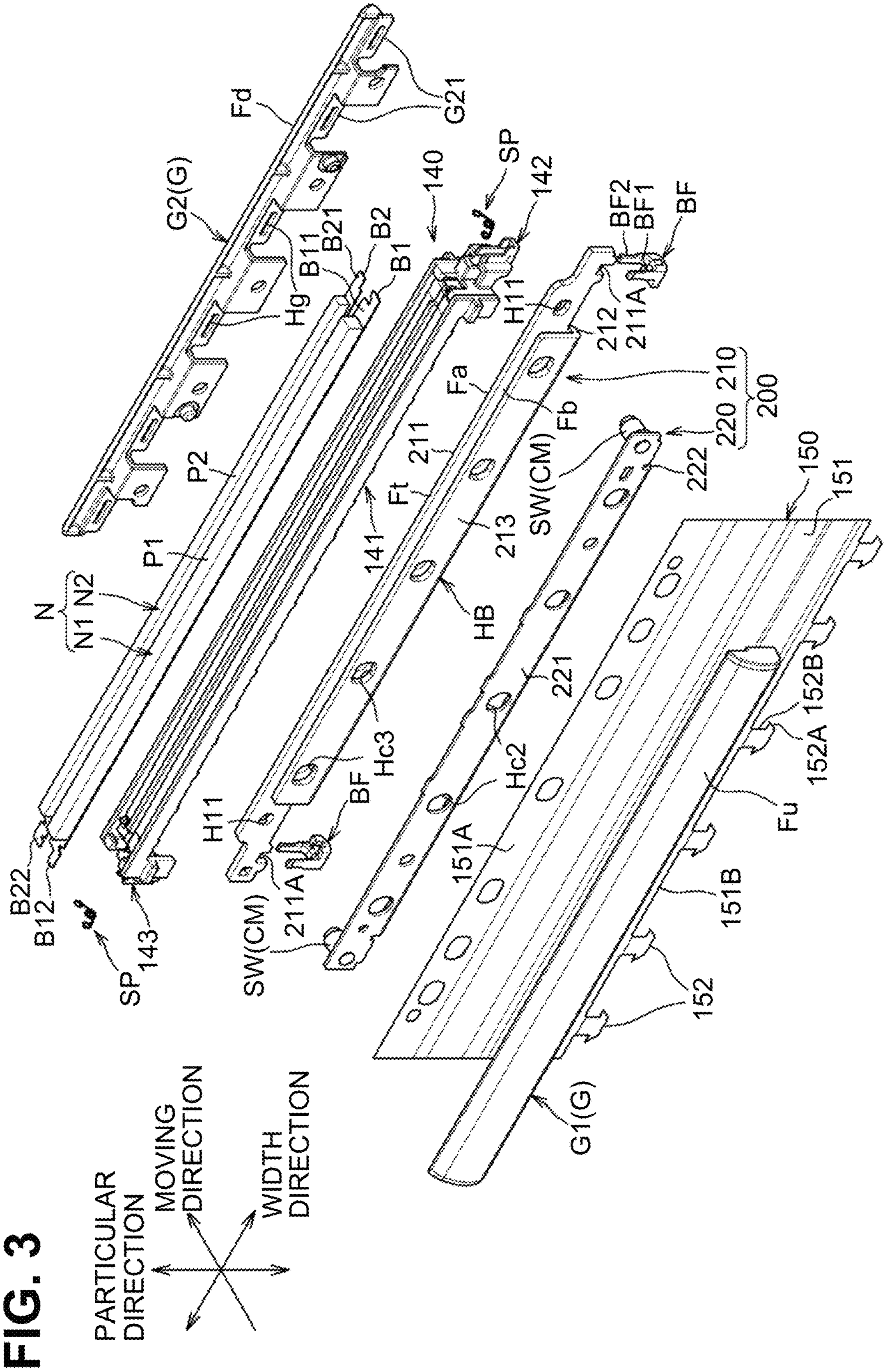
FIG. 3 is an exploded perspective view of components to be disposed inside a belt of the fixing device.

In other words, the nip forming member N, the holder 140, the stay 200, the belt guide G, and the sliding sheet 150 are covered by the belt 130. The holder 140 and the stay 200 function as a supporting member that supports the nip forming member N. As illustrated in FIG. 3, the nip forming member N, the holder 140, the stay 200, the belt guide G, and the sliding sheet 150 each have a greater dimension in the width direction than in directions orthogonal to the width direction.

As illustrated in FIGS. 2 and 3, the nip forming member N pinches the belt 130 with the rotator 120, for forming a nip NP between the rotator 120 and the belt 130. The nip forming member N includes an upstream nip forming member N1 and a downstream nip forming member N2.

The upstream nip forming member N1 has an upstream pad P1 and an upstream fixing plate B1.

The upstream pad P1 has a box shape. The upstream pad P1 is made of rubber, such as silicone rubber. The upstream pad P1 and the rotator 120 pinch the belt 130 therebetween, forming an upstream nip NP1.

In the following description, a moving direction of the belt 130 at the upstream nip NP1 and the nip NP is referred to as just "a moving direction". The moving direction is a direction where the belt 130 moves along an outer peripheral surface of the rotator 120. This direction is, however, along a direction substantially orthogonal to the particular direction and the width direction, and thus illustrated as the direction orthogonal to the particular direction and the width direction. The moving direction is substantially the same as a direction directed from an entrance to the nip NP toward an exit therefrom.

The upstream pad P1 is fixed to a surface of the upstream fixing plate B1 facing the rotator 120. The upstream pad P1 slightly protrudes upstream in the moving direction relative to an upstream end of the upstream fixing plate B1.

The upstream fixing plate B1 is made of a material harder than that of the upstream pad P1, for example, metal. The upstream fixing plate B1 is longer in the width direction than the upstream pad P1. The upstream fixing plate B1 has both end portions B11, B12 in the width direction, each of which is located at an outer position relative to a corresponding one of both ends of the upstream pad P1.

The downstream nip forming member N2 is disposed downstream apart from the upstream nip forming member N1 in the moving direction. The downstream nip forming member N2 has a downstream pad P2 and a downstream fixing plate B2.

The downstream pad P2 has a box shape. The downstream pad P2 is made of rubber, such as silicone rubber. The downstream pad P2 and the rotator 120 pinch the belt 130 therebetween, forming a downstream nip NP2. The downstream pad P2 is spaced from the upstream pad P1 in the moving direction.

This structure provides, between the upstream nip NP1 and the downstream nip NP2, a middle nip NP3 where no pressure from the pressure unit 82 directly acts. At the middle nip NP3, the belt 130 still contacts the rotator 120 but hardly receives pressure because there is nothing to pinch the belt 130 with the rotator 120. Thus, the sheet S is heated by the rotator 120 under almost no pressure while passing the middle nip NP3. In this embodiment, the nip NP refers to a range from the upstream end of the upstream nip NP1 to the downstream end of the downstream nip NP2, that is, the entire range where the outer peripheral surface of the belt 130 and the rotator 120 contact each other. In other words, the nip NP includes a portion not subjected to pressure from the upstream pad P1 and the downstream pad P2.

The downstream pad P2 is fixed to a surface of the downstream fixing plate B2 facing the rotator 120. The downstream pad P2 slightly protrudes downstream in the moving direction relative to a downstream end of the downstream fixing plate B2.

The downstream fixing plate B2 is made of a material harder than that of the downstream pad P2, for example, metal. The downstream fixing plate B2 is longer in the width direction than the downstream pad P2. The downstream fixing plate B2 has both end portions B21, B22 in the width direction, each of which is located at an outer position relative to a corresponding one of both ends of the downstream pad P2.

The upstream pad P1 has a higher hardness than the elastic layer 122 of the rotator 120. The downstream pad P2 has a higher hardness than the upstream pad P1.

The above hardness refers to a durometer hardness specified in ISO7619-1. The durometer hardness is a value that may be obtained from an amount of the penetration of a pin into a specimen under specified conditions. For example, when the durometer hardness of the elastic layer 122 is 5, that of the upstream pad P1 is preferably 6 to 10, and that of the downstream pad P2 is preferably 70 to 90.

The hardness of silicone rubber may be adjusted by changing the ratio of an additive (e.g., a silica filler and a carbon filler) to be added at the time of manufacture. Specifically, the hardness of silicone rubber increases with a higher ratio of an additive. The hardness decreases with the addition of silicone-based oil. As a rubber processing method, injection molding and extrusion may be adopted. Generally, injection molding is suitable for low hardness rubber and extrusion is suitable for high hardness rubber.

The holder 140 holds the nip forming member N. The holder 140 is made of a heat-resistant resin. The holder 140 includes a holder body 141 and two engaging portions 142, 143.

Figure 5:
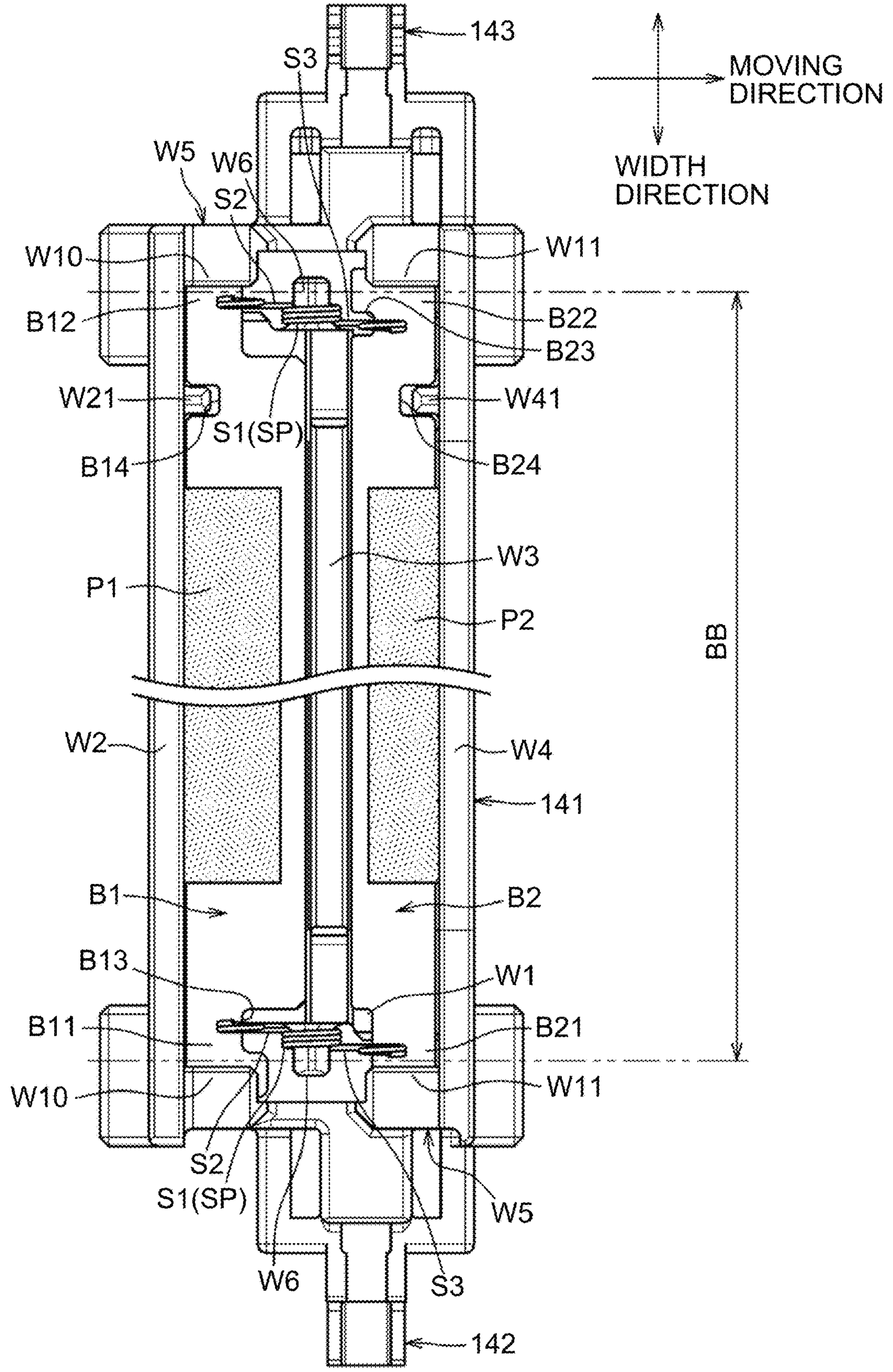
FIG. 5 is a top view of the holder having the nip forming member and the springs attached thereto, viewed from a rotator of the fixing device.

The holder body 141 holds the nip forming member N. The holder body 141 is mainly located within a range of the belt 130. More specifically, as illustrated in FIG. 5, the holder body 141 includes a pair of side walls W5, one at each of its both ends in the width direction. Each of the side walls W5 includes protrusions W10, W11. A main portion of the holder body 141 except for the side walls W5 is located within a width BB of the belt 130. The springs SP are disposed within the width BB of the belt 130. As illustrated in FIGS. 2 and 3, the holder body 141 is supported by the stay 200 (i.e., a first stay 210 and a second stay 220 which will be described later).

Figure 12:
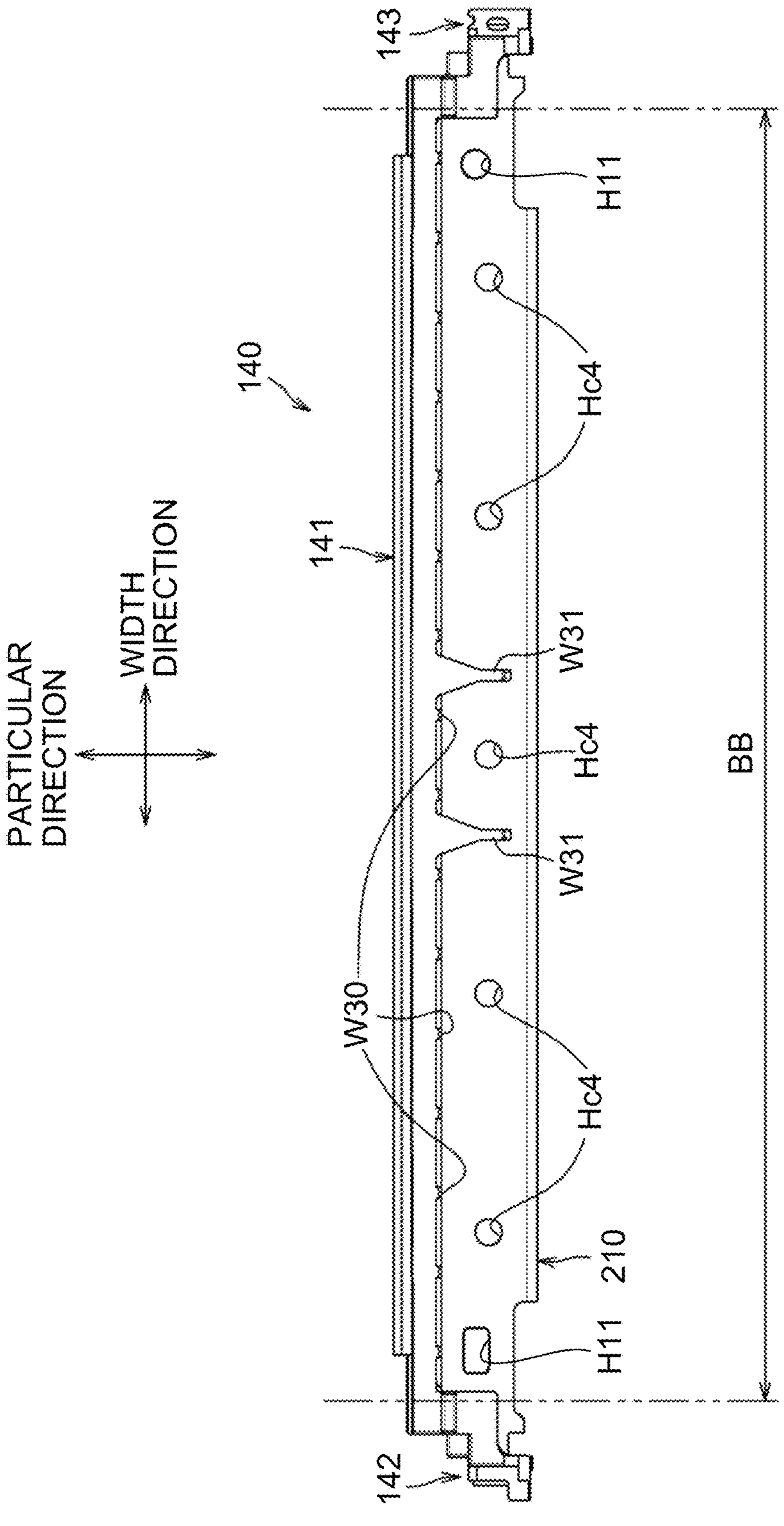
FIG. 12 is a side sectional view of the holder and the first stay viewed from the downstream side in the moving direction.

The engaging portions 142, 143 protrude from ends of the holder body 141 in the width direction. The engaging portions 142, 143 are located at different positions from the belt 130 in the width direction. As illustrated in FIGS. 5 and 12, the engaging portions 142, 143 are located outside of the width BB of the belt 130. As illustrated in FIGS. 2 and 3, the engaging portions 142, 143 engage with respective ends of the first stay 210 in the width direction.

The stay 200 is located opposite to the nip forming member N relative to the holder 140 and supports the holder 140. The stay 200 includes a first stay 210 and a second stay 220.

The first stay 210 supports the holder body 141 of the holder 140. The first stay 210 is made of metal. The first stay 210 includes a base portion 211 and a bend portion HB by hemming.

The base portion 211 has, at its first end in the particular direction, a contact surface Ft to contact the holder body 141 of the holder 140. The contact surface Ft is a flat surface orthogonal to the particular direction. The base portion 211 is constituted as a downstream wall located downstream relative to the bend portion HB in the moving direction. The base portion 211 has a downstream surface Fa and an upstream surface Fb in the moving direction.

The bend portion HB is a portion bent by hemming. The bend portion HB is L-shaped and extends from a second end of the base portion 211 in the particular direction toward the holder body 141. The bend portion HB has a bottom wall 212 extending from the base portion 211 upstream in the moving direction, and an upstream wall 213 extending from the bottom wall 212 toward the holder body 141 along the particular direction. The upstream wall 213 is disposed upstream of the base portion 211 that is a downstream wall in the moving direction. The upstream wall 213 is disposed parallel to the base portion 211. The upstream wall 213 and the base portion 211 face each other in the moving direction with a space smaller than a thickness of the first stay 210.

The bend portion HB is shorter in the width direction than the base portion 211. The base portion 211 has both ends in the width direction, each of which is located at an outer position relative to a corresponding one of both ends of the bend portion HB.

The base portion 211 has, at each of its both end portions in the width direction, one load receiver 211A to receive a load from the pressure mechanism 300 (refer to FIG. 15). The load receivers 211A are recesses that are open opposite the nip forming member N in the particular direction and formed at an end, in the particular direction, of the base portion 211 opposite to the nip forming member N.

The load receivers 211A receive respective buffers BF made of, for example, resin. The buffers BF prevent the metal base portion 211 and metal pressure arms 310 (only one of which is illustrated in FIG. 15) from rubbing against each other. Each of the buffers BF includes an engagement portion BF1 to engage with a corresponding one of the load receivers 211A, and a pair of legs BF2 disposed upstream and downstream in the moving direction relative to each end, in the width direction, of the base portion 211.

The second stay 220 supports the holder body 141 of the holder 140. The second stay 220 is made of metal. The second stay 220 is disposed upstream of the first stay 210 in the moving direction. The second stay 220 includes a base portion 221 located parallel to the upstream wall 213 of the first stay 210, and an extension portion 222 extending from an end of the base portion 221 opposite to the nip forming member N toward the first stay 210.

The base portion 221 is longer in the width direction than the extension portion 222 and the bend portion HB of the first stay 210. The base portion 221 has both ends in the width direction, each of which is located at an outer position relative to a corresponding one of both ends of the extension portion 222 and the bend portion HB. The first stay 210 and the second stay 220 are connected with two connectors CM. More specifically, each of the connectors CM connects a corresponding one of both ends of the base portion 211 of the first stay 210 and a corresponding one of both ends of the base portion 221 of the second stay 220 in the width direction. Each of the connectors CM connects the base portion 211 and the base portion 221 at a different position from the bend portion HB.

Figure 10A:
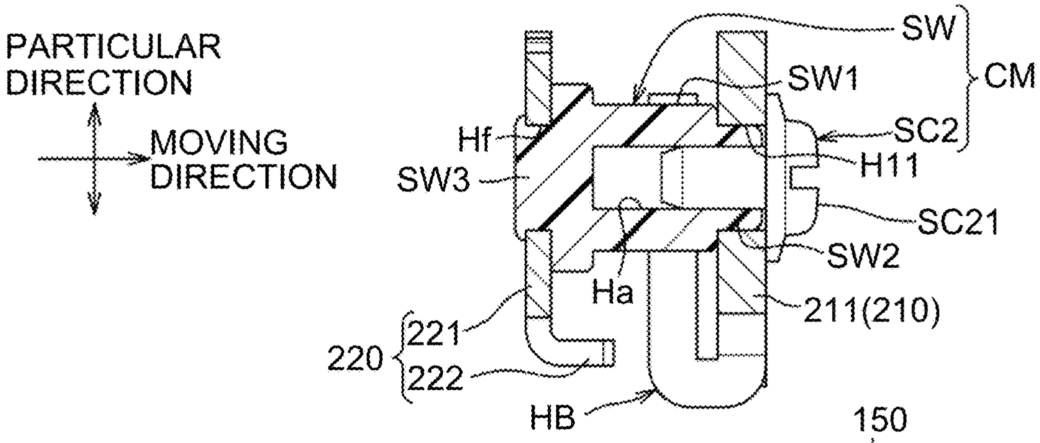
FIG. 10A is a cross sectional view illustrating the structure around a connector of the stay.

As illustrated in FIG. 10A, each connector CM includes a crimped member SW crimped to the second stay 220 and a second screw SC2 with which the crimped member SW is fastened to the first stay 210. The crimped member SW includes a base SW1, a first protrusion SW2, and a second protrusion SW3. The base SW1 is sandwiched between the first stay 210 and the second stay 220. The first protrusion SW2 extends from one end of the base SW1 downstream in the moving direction. The second protrusion SW3 extends from the other end of the base SW1 upstream in the moving direction.

The second stay 220 has two holes Hf. Each of the holes Hf receives therein the second protrusion SW3 of a corresponding one of the connectors CM. The second protrusion SW3 protrudes upstream from the hole Hf in the moving direction, and its protruding end is crimped. The second stay 220 is thus pinched between the crimped end of the second protrusion SW3 and an end of the base SW1.

The first stay 210 has two holes H11. Each of the holes H11 receives therein the first protrusion SW2 of a corresponding one of the connectors CM. The first protrusion SW2 has a hole Ha in which the second screw SC2 is screwed. The hole Ha has a closed end or is recessed with an opening on one side. The second screw SC2 is screwed in the hole Ha and thus the first stay 210 is pinched between a head SC21 of the second screw SC2 and the base SW1.

As illustrated in FIG. 3, the holes H11 are formed to be aligned with respective connectors CM. One of the holes H11 is a round hole and the other one is a long hole which is long in the width direction.

As illustrated in FIGS. 2 and 3, the belt guide G guides the inner peripheral surface of the belt 130. The belt guide G is made of a heat-resistant resin. The belt guide G includes an upstream guide G1 and a downstream guide G2.

The upstream guide G1 has an upstream guide surface Fu to guide the inner peripheral surface of the belt 130 at a position upstream from the nip forming member N in the rotation direction of the belt 130, that is, in the moving direction at the nip NP. More specifically, the upstream guide surface Fu guides the inner peripheral surface of the belt 130 via the sliding sheet 150. The upstream guide G1 is spaced from the upstream pad P1 in the moving direction.

The downstream guide G2 has a downstream guide surface Fd to guide the belt 130 at a position downstream from the nip forming member N in the rotation direction of the belt 130, that is, in the moving direction at the nip NP. More specifically, the downstream guide surface Fd guides the inner peripheral surface of the belt 130 via the sliding sheet 150. The downstream guide G2 is spaced from the downstream pad P2 in the moving direction. The downstream guide G2 is spaced in the particular direction from a rotation center X1 of the rotator 120 further than the downstream pad P2.

The sliding sheet 150 is rectangular and reduces frictional resistance between each pad P1, P2 and the belt 130. The sliding sheet 150 is pinched at the nip NP between the inner peripheral surface of the belt 130 and each pad P1, P2. The sliding sheet 150 is made of an elastically deformable material. The sliding sheet 150 may be made of any material. In this embodiment, a polyimide-containing resin sheet is used.

The sliding sheet 150 has a base 151 and six hooks 152. The base 151 is rectangular. The base 151 has a sliding surface Fs (FIG. 2) on which the inner peripheral surface 131 of the belt 130 slides. The base 151 has an upstream end portion 151A and a downstream end portion 151B in the moving direction of the belt 130.

The upstream end portion 151A of the base 151 is fixed to the upstream guide G1. The base 151 is located covering the upstream guide surface Fu, the nip forming member N, and the downstream guide surface Fd.

The hooks 152 are located at the downstream end portion 151B of the base 151. The hooks 152 are part of the sliding sheet 150. The hooks 152 are thus elastically deformable. Each of the hooks 152 has an end portion 152A and a neck portion 152B.

The end portion 152A has a width (i.e., a dimension in the width direction) narrower the farther the end portion 152A is from the base 151. The end portion 152A protrudes relative to both ends of the neck portion 152B in the width direction. The neck portion 152B connects the end portion 152A and the base 151. The neck portion 152B has a width (i.e., a dimension in the width direction) narrower than the maximum width of the end portion 152A.

The downstream guide G2 has six hook engaging portions G21 in association with the six hooks 152. The hooks 152 and the hook engaging portions G21 are respectively spaced apart from one another in the width direction. The hooks 152 engage in the hook engaging portions G21.

Each of the hook engaging portions G21 has an aperture Hg in which a corresponding hook 152 engages. The end portion 152A of the hook 152 has a minimum width smaller than a width of the aperture Hg. The neck portion 152B has a width smaller than the width of the aperture Hg. The end portion 152A has a maximum width greater than the width of the aperture Hg.

As illustrated in FIG. 2, the hook engaging portion G21 is located at a position downstream from the downstream guide surface Fd in the rotation direction of the belt 130 and apart from the belt 130. The hook engaging portion G21 is spaced downstream from the base portion 211 of the first stay 210 in the moving direction.

The hook engaging portion G21 faces the base portion 211 of the first stay 210 in the moving direction. More specifically, the aperture Hg of the hook engaging portion G21 faces the base portion 211 in the moving direction. The hook 152 of the sliding sheet 150 is inserted into and engages with the aperture Hg from a downstream side in the moving direction.

The hook engaging portion G21 is spaced apart from the base portion 211 by a distance greater than a length of the end portion 152A of the hook 152 in the moving direction. The neck portion 152B of the hook 152 has a length greater than a thickness of the hook engaging portion G21.

Figures 4A, 4B:
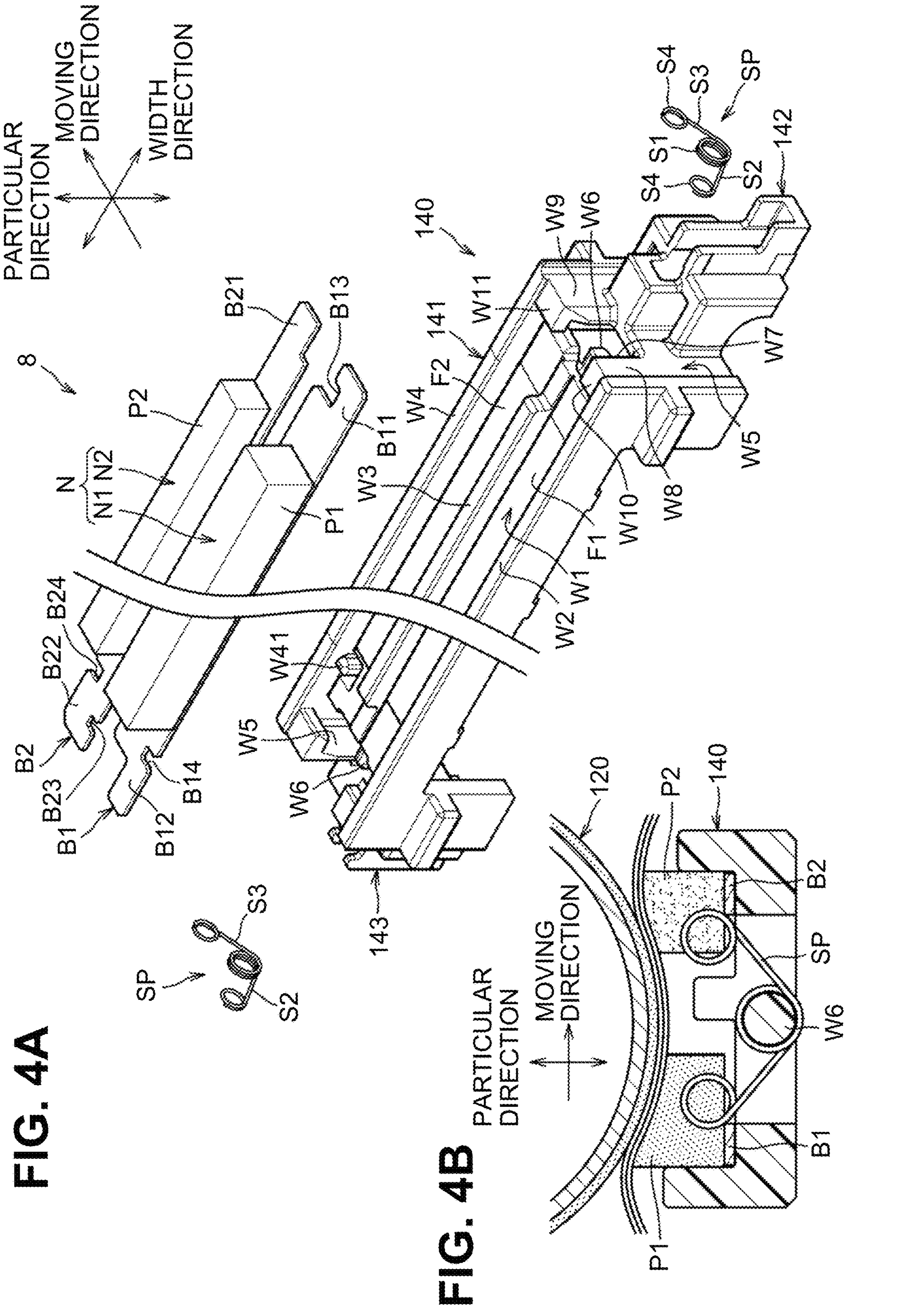
FIG. 4A is an enlarged, exploded perspective view of a nip forming member, a holder, and springs of the fixing device.
FIG. 4B is a cross sectional view illustrating a structure around a boss of the holder.

As illustrated in FIG. 4A, the holder body 141 includes a support wall W1, an upstream wall W2, a middle wall W3, a downstream wall W4, and a pair of side walls W5. The holder body 141 has substantially a symmetric structure in the width direction. The following description about a structure around an end of the holder body 141 in the width direction will be made based on one end of the holder body 141 (i.e., a right end thereof in the drawings), and a description about the other end of the holder body 141 will be omitted.

The support wall W1 supports the nip forming member N and is located opposite to the rotator 120 relative to the nip forming member N. The support wall W1 has an upstream support surface F1 for supporting the upstream fixing plate B1 and a downstream support surface F2 for supporting the downstream fixing plate B2. When viewed in cross section orthogonal to the width direction, the upstream support surface F1 and the downstream support surface F2 are orthogonal to the particular direction. The upstream support surface F1 and the downstream support surface F2 are at the same positions in the particular direction. When viewed in cross section orthogonal to the moving direction, the upstream support surface F1 and the downstream support surface F2 are curved such that their central portions are closer to the rotation center X1 of the rotator than their both ends in the width direction. In other words, the central portions of the upstream support surface F1 and the downstream support surface F2 in the width direction are convex toward the rotator 120. The upstream support surface F1 and the downstream support surface F2 protrude toward the rotator 120 by substantially the same amount.

The support wall W1 has one boss W6 (FIG. 6A) located at each of its both ends in the width direction. Each boss W6 receives a spring SP. As illustrated in FIG. 4B, the boss W6 is located at a position farther from the rotator 120 than the upstream fixing plate B1 and the downstream fixing plate B2 in the particular direction. As illustrated in FIGS. 4A and 5, the bosses W6 protrude away from each other from the respective ends of the support wall W1 in the width direction. One of the bosses W6 is located between a first end portion B11 of the upstream fixing plate B1 and a first end portion B21 of the downstream fixing plate B2 and the other is located between a second end portion B12 of the upstream fixing plate B1 and a second end portion B22 of the downstream fixing plate B2 in the moving direction.

The springs SP urge the upstream nip forming member N1 and the downstream nip forming member N2 away from each other. More specifically, the springs SP urge, in the moving direction, the upstream nip forming member N1 toward the upstream wall W2 and the downstream nip forming member N2 toward the downstream wall W4. The springs SP urge, in the particular direction, the upstream nip forming member N1 toward the upstream support surface F1 of the support wall W1 and the downstream nip forming member N2 toward the downstream support surface F2 of the support wall W1.

Each of the springs SP includes a coil portion S1, a first arm S2, and a second arm S3. The coil portion S1 has one or more turns of wire. Each boss W6 enters the coil portion S1 of a corresponding spring SP, thereby supporting the spring SP.

The first arm S2 diagonally extends from one end of the coil portion S1 upstream in the moving direction and toward the rotator 120 to contact the first end portion B11 of the upstream fixing plate B1. More specifically, the first end portion B11 of the upstream fixing plate B1 has a downstream end defining a recess B13 recessed upstream. The first arm S2 enters the recess B13 and contacts the most recessed portion of the recess B13.

The second arm S3 diagonally extends from the other end of the coil portion S1 downstream in the moving direction and toward the rotator 120 to contact the first end portion B21 of the downstream fixing plate B2. More specifically, the first end portion B21 of the downstream fixing plate B2 has a narrower width (i.e., a shorter length in the moving direction) than a central portion of the downstream fixing plate B2 in the width direction. The first end portion B21 of the downstream fixing plate B2 has an upstream end located downstream further than an upstream end of the central portion of the downstream fixing plate B2. A distance between the most recessed portion of the recess B13 at the first end portion B11 of the upstream fixing plate B1 and the first end portion B21 of the downstream fixing plate B2 is greater than an outside diameter of the coil portion S1.

In this embodiment, one spring SP disposed at a first end (i.e., a right end in the drawings) of the holder 140 in the width direction is identical in shape with the other spring SP disposed at a second end, opposite to the first end, of the holder 140. As illustrated in FIG. 5, for the spring SP disposed at the first end of the holder 140 in the width direction, the first arm S2 that urges the upstream fixing plate B1 is located at an inner position relative to the second arm S3 in the width direction. For the spring SP disposed at the second end of the holder 140 in the width direction, the second arm S3 is located at an inner position relative to the first arm S2 in the width direction.

The second end portion B12 of the upstream fixing plate B1 has a width narrower than the center portion of the upstream fixing plate B1 in the width direction. A downstream end of the second end portion B12 is located at the same position, in the moving direction, as the most recessed portion of the recess B13 in the first end portion B11. For the spring SP disposed at the second end of the holder 140, its first arm S2 contacts the second end portion B12 of the upstream fixing plate B1.

The second end portion B22 of the downstream fixing plate B2 has an upstream end defining a recess B23 recessed downstream. The most recessed portion of the recess B23 is located at the same position, in the moving direction, as the upstream end of the first end portion B21 of the downstream fixing plate B2. For the spring SP disposed at the second end of the holder 140, its second arm S3 enters the recess B23 and contacts the most recessed portion of the recess B23.

In other words, each of the recesses B13, B23 of the fixing plates B1, B2 is located at a position to engage with a corresponding arm S2, S3 located at an inner position relative to the coil portion S1 in the width direction. Unlike this embodiment, if a fixing plate has a recess to engage with a corresponding arm located at an outer position relative to the coil portion in the width direction, the fixing plate may have, in the width direction, its end spaced from the recess by a specified distance to ensure adequate strength at the end, which may lead to the need to increase the size of the fixing plate in the width direction. In this embodiment, however, each of the recesses B13, B23 is formed at a position to engage with a corresponding arm S2, S3 located at an inner position relative to the coil portion S1 in the width direction, thus reducing the need to increase the size of the fixing plates B1, B2 in the width direction.

Returning to FIG. 4A, the first arm S2 and the second arm S3 have bend portions S4 at their ends. The bend portions S4 are ring-shaped. The bend portion S4 of the first arm S2 protrudes from the first arm S2 toward the second arm S3. The bend portion S4 of the second arm S3 protrudes from the second arm S3 toward the first arm S2.

The springs SP are sized not to interfere with the sliding sheet 150 in the fixing device 8 forming a nip between the rotator 120 and the belt 130 as illustrated in FIG. 2. When each spring SP is attached to the holder 140, its end closest to the rotator 120 is located at substantially the same position as an end of the upstream wall W2 or the downstream wall W4 closest to the rotator 120 (or at a position away from the rotator 120 further than the end of the upstream wall W2 or the downstream wall W4).

The upstream wall W2, the middle wall W3, and the downstream wall W4 extend from the support wall W1 toward the rotator 120. The upstream wall W2 functions as a first restricting member that restricts upward movement of the upstream nip forming member N1 in the moving direction by contacting the upstream pad P1 of the upstream nip forming member N1. The upstream wall W2 is disposed at an upstream end of the support wall W1. In the width direction, the upstream wall W2 extends outwardly relative to each end of the support wall W1 and extends in a direction away from each end of the nip forming member N.

The downstream wall W4 functions as a second restricting member that restricts downward movement of the downstream nip forming member N2 in the moving direction by contacting the downstream pad P2 of the downstream nip forming member N2. The downstream wall W4 is disposed at a downstream end of the support wall W1. In the width direction, the downstream wall W4 extends outwardly relative to each end of the support wall W1 and extends in the direction away from each end of the nip forming member N.

The middle wall W3 is disposed between and spaced from the upstream wall W2 and the downstream wall W4.

The upstream support surface F1 is located between the upstream wall W2 and the middle wall W3. The downstream support surface F2 is located between the middle wall W3 and the downstream wall W4. The upstream pad P1 is spaced from the middle wall W3 (refer to FIG. 5). The downstream pad P2 is spaced from the middle wall W3 (refer to FIG. 5).

Each of the side walls W5 is located between the support wall W1 and a respective one of the engaging portions 142, 143 in the width direction. The side walls W5 extend in a direction crossing the width direction, more specifically, in a direction orthogonal to the width direction. The side walls W5 connect both ends, in the width direction, of both of the upstream wall W2 and the downstream wall W4. The side walls W5 are spaced from the support wall W1 in the width direction.

Each of the side walls W5 has, at its end facing the rotator 120, a recess W7 that is recessed away from the rotator 120. The recess W7 is located at a position corresponding to the boss W6 in the moving direction. In other words, the boss W6 is located within a range of the recess W7 in the moving direction. The recess W7 faces the boss W6 in the width direction.

The side wall W5 includes a first portion W8 and a second portion W9. The first portion W8 is located upstream of the recess W7 in the moving direction. The second portion W9 is located downstream of the recess W7 in the moving direction. The second portion W9 is spaced downstream from the first portion W8 in the moving direction.

The boss W6 is located between the first portion W8 and the second portion W9 in the moving direction. A distance between the first portion W8 and the second portion W9 in the moving direction, that is, a dimension for the recess W7 in the moving direction, is greater than an outside diameter of the coil portion S1 of the spring SP.

The side wall W5 further includes a first protrusion W10 and a second protrusion W11. The first protrusion W10 extends from an end of the first portion W8 facing the rotator 120 toward the upstream pad P1 in the width direction. The first protrusion W10 restricts the movement of the upstream fixing plate B1 toward the rotator 120. The second protrusion W11 extends from an end of the second portion W9 facing the rotator 120 toward the downstream pad P2 in the width direction. The second protrusion W11 restricts the movement of the downstream fixing plate B2 toward the rotator 120.

As illustrated in FIG. 5, the first protrusion W10 has a portion located at the same position as the first arm S2 in the moving direction. In other words, the first arm S2 has a portion located within a range of the first protrusion W10 in the moving direction. In still other words, when projected in the width direction, the portion of the first arm S2 overlaps the first protrusion W10. The first protrusion W10 is configured to contact the first arm S2 to restrict inclination and movement of the first arm S2, which may result from slight inclination and movement of the spring SP in the width direction.

The second protrusion W11 has a portion located at the same position as the second arm S3 in the moving direction. In other words, the second arm S3 has a portion located within a range of the second protrusion W11 in the moving direction. In still other words, when projected in the width direction, the portion of the second arm S3 overlaps the second protrusion W11. The second protrusion W11 is configured to contact the second arm S3 to restrict inclination and movement of the second arm S3, which may result from slight inclination and movement of the spring SP in the width direction.

The distance between the first protrusion W10 and the first arm S2 in the width direction and the distance between the second protrusion W11 and the second arm S3 are preferably smaller than larger. For example, those distances are preferably smaller than three times the diameter of the wire of the spring SP.

The boss W6 extends in the width direction to a position where the boss W6 overlaps the first protrusion W10 and the second protrusion W11. In other words, the boss W6 protrudes, in the width direction, outward relative to an end of each protrusion W10, W11 facing the bend portion S4 of the spring SP.

As illustrated in FIGS. 4A and 5, the second end portion B12 of the upstream fixing plate B1 has a restriction recess B14 recessed away from the upstream wall W2 in the moving direction. The second end portion B22 of the downstream fixing plate B2 has a restriction recess B24 recessed away from the downstream wall W4 in the moving direction.

The upstream wall W2 has a restriction protrusion W21 to engage in the restriction recess B14 and restrict movement of the upstream fixing plate B1 in the width direction. The downstream wall W4 has a restriction protrusion W41 to engage in the restriction recess B24 and restrict movement of the downstream fixing plate B2 in the width direction.

The restriction recesses B14, B24 and the restriction protrusions W21, W41 are located, in the width direction, between each end of the upstream pad P1 and the downstream pad P2 and the boss W6.

Figure 6A:
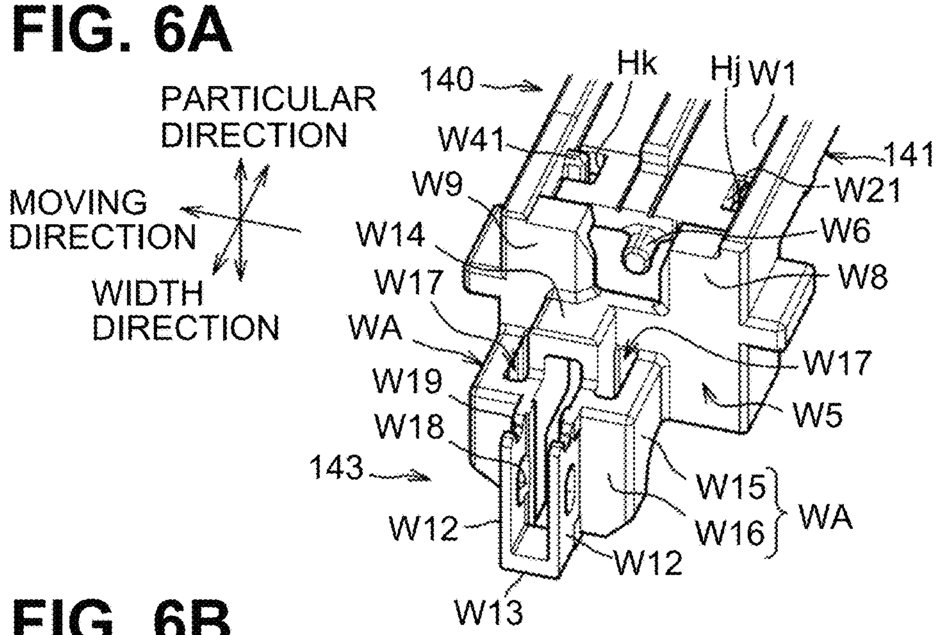
FIG. 6A is a perspective view illustrating a structure around an engaging portion of the holder.
Figure 6B:
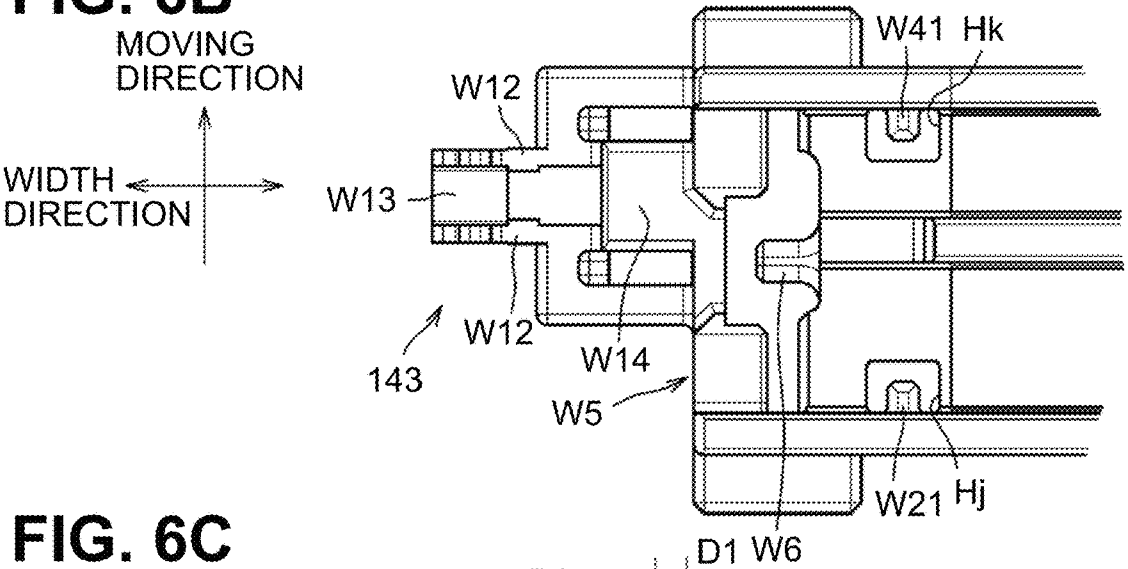
FIG. 6B is a top view illustrating the structure around the engaging portion of the holder.

As illustrated in FIGS. 6A and 6B, the restriction protrusions W21, W41 extend along the particular direction. The support wall W1 has a through hole Hj to allow the restriction protrusion W21 to pass therethrough. The support wall W1 has a through hole Hk to allow the restriction protrusion W41 to pass therethrough. For example, if a holder 140 is to be molded such that the support wall W1 has such a restriction protrusion protruding from its surface facing the rotator 120, the molded holder 140 may have burrs, in the form of curves and slopes, at corners between the restriction protrusion and the surface of the support wall W1. This may cause separation of the fixing plates B1, B2 from the support wall W1. If the restriction recesses are enlarged to prevent the separation, the fixing plates B1, B2 may rattle in the width direction.

In this embodiment, however, the restriction protrusions W21, W41 are formed at the upstream wall W2 and the downstream wall W4 to pass through the respective through holes Hj, Hk, thus avoiding the above problem. This embodiment shows but is not limited to the through holes Hj, Hk. The support wall W1 may have, at its surface facing the rotator 120, a recess recessed away from the rotator 120 to allow the restriction protrusion to protrude from the most recessed portion of the recess. In other words, the surface, facing the rotator 120, of the support wall W1 may have a portion around the restriction protrusion that is farther from the rotator 120 than a remaining portion thereof.

Figure 6C:
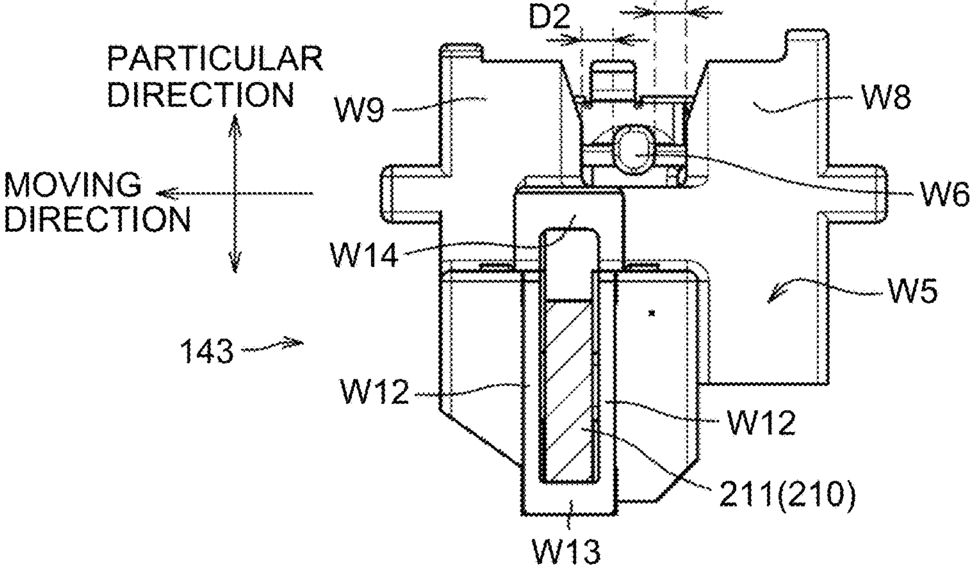
FIG. 6C is a side sectional view illustrating the structure around the engaging portion of the holder.

As illustrated in FIGS. 6A to 6C, the engaging portion 143 at the second end in the width direction includes a pair of pinching walls W12 and a first connecting wall W13 connecting the pinching walls W12. The pinching walls W12 face each other in the moving direction and pinch therebetween an end, in the width direction, of the base portion 211 of the first stay 210. Each of the pinching walls W12 extends outward from the side wall W5 in the width direction.

The first connecting wall W13 is located opposite to the rotator 120 relative to an end of the base portion 211 in the width direction and in contact with the end of the base portion 211 in the width direction. The first connecting wall W13 connects respective outer ends of the pinching walls W12 in the width direction. The first connecting wall W13 is apart from the side wall W5 in the width direction. This provides, between the first connecting wall W13 and the side wall W5, a space for exposing the load receiver 211A (FIG. 7) of the first stay 210 downward. The buffer BF (FIG. 7) can be easily attached to the load receiver 211A exposed downward.

The holder 140 further includes a second connecting wall W14 and reinforcing portions WA. The second connecting wall W14 connects the pinching walls W12 to each other. The reinforcing portions WA connect the pinching walls W12 and the side wall W5. The second connecting wall W14 is located opposite to the first connecting wall W13 relative to an end of the base portion 211 in the width direction. The second connecting wall W14 is apart from the base portion 211 in the particular direction. The second connecting wall W14 is apart from the first connecting wall W13 in the width direction and is connected to the side wall W5.

The reinforcing portions WA reinforce the pinching walls 12 and each is provided to a corresponding one of the pinching wall W12. The reinforcing portions WA are symmetric in structure in the moving direction.

The reinforcing portions WA each have a first wall W15 and a second wall W16. The first wall W15 is disposed parallel to a corresponding pinching wall W12 and is connected to the side wall W5. The second wall W16 is disposed parallel to the side wall W5 and connects the first wall W15 and the pinching wall W12. The first wall W15, the second wall W16, the pinching wall W12, and the side wall W5 define a hole W17. One of the legs BF2 (FIG. 7) of the buffer BF engages in the hole W17.

As illustrated in FIG. 6C, a distance D1 between the first portion W8 and the boss W6 in the moving direction is greater than the diameter of the wire of the spring SP (FIG. 4). A distance D2 between the second portion W9 and the boss W6 in the moving direction is greater than the diameter of the wire of the spring SP.

As illustrated in FIG. 6A, each pinching wall W12 has a through hole W18 and a recess W19. The through hole W18 is formed through the pinching wall W12 in the moving direction. The recess W19 is formed at an end of the pinching wall W12 facing the rotator 120. The through hole W18 and the recess W19 are opposite to the side wall W5 relative to the second wall W16. The through hole W18 and the recess W19 are at the same positions in the width direction. The through hole W18 and the recess W19 receive a movement restriction member R illustrated in FIGS. 13 and 14.

Figure 13:
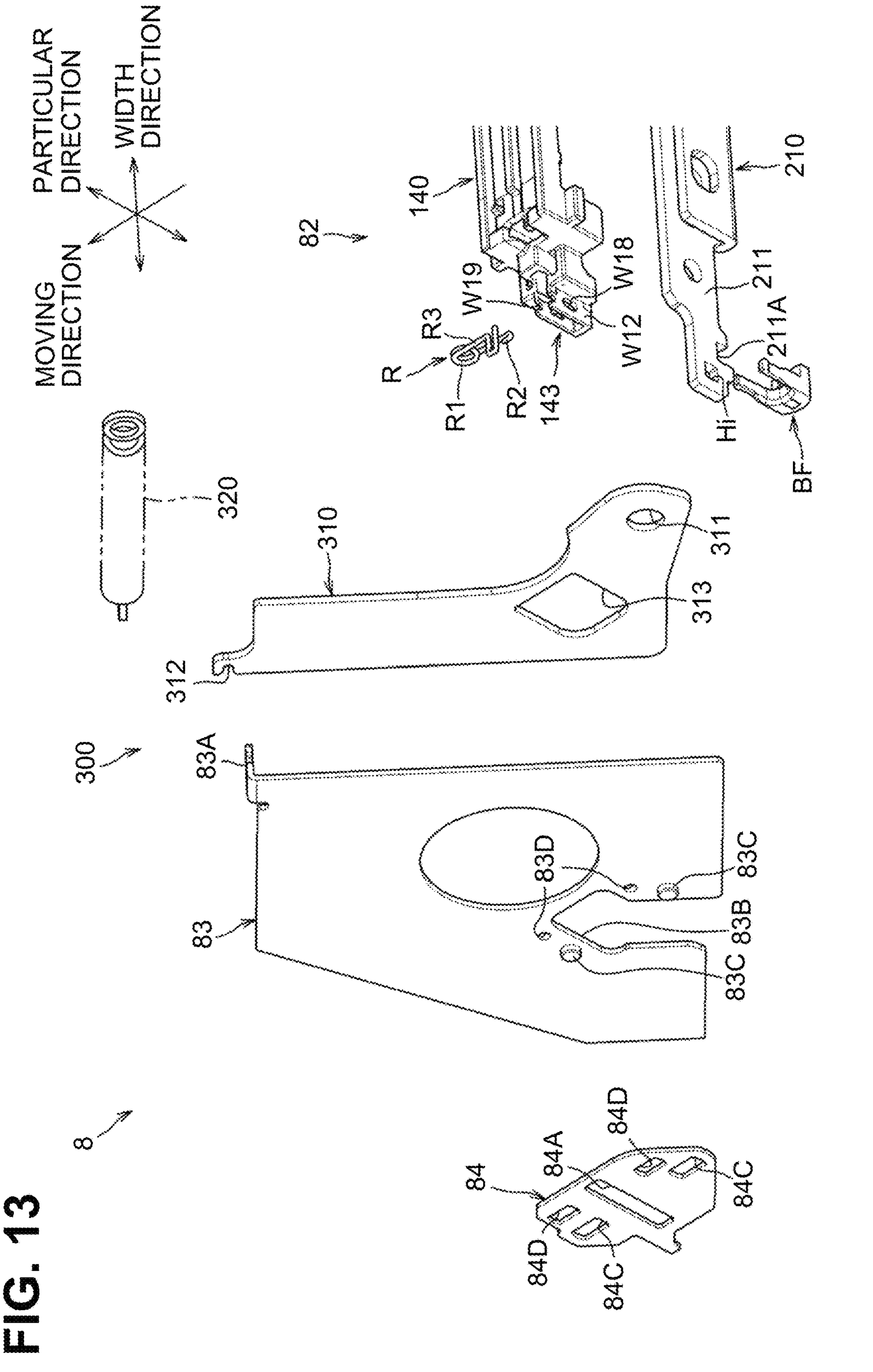
FIG. 13 is an exploded perspective view of a pressure mechanism of the fixing device.

The movement restriction member R restricts movement of the first stay relative to the holder 140 in the width direction. The movement restriction member R is a torsion spring made of a metal wire. As illustrated in FIG. 13, the movement restriction member R has a coil R1, a first arm R2 extending from one end of the coil R1, and a second arm R3 extending from the other end of the coil R1.

The base portion 211 of the first stay 210 has, at each end in the width direction, a through hole Hi. The through hole Hi is formed at an outer position relative to the load receiver 211A in the width direction.

Figure 14:
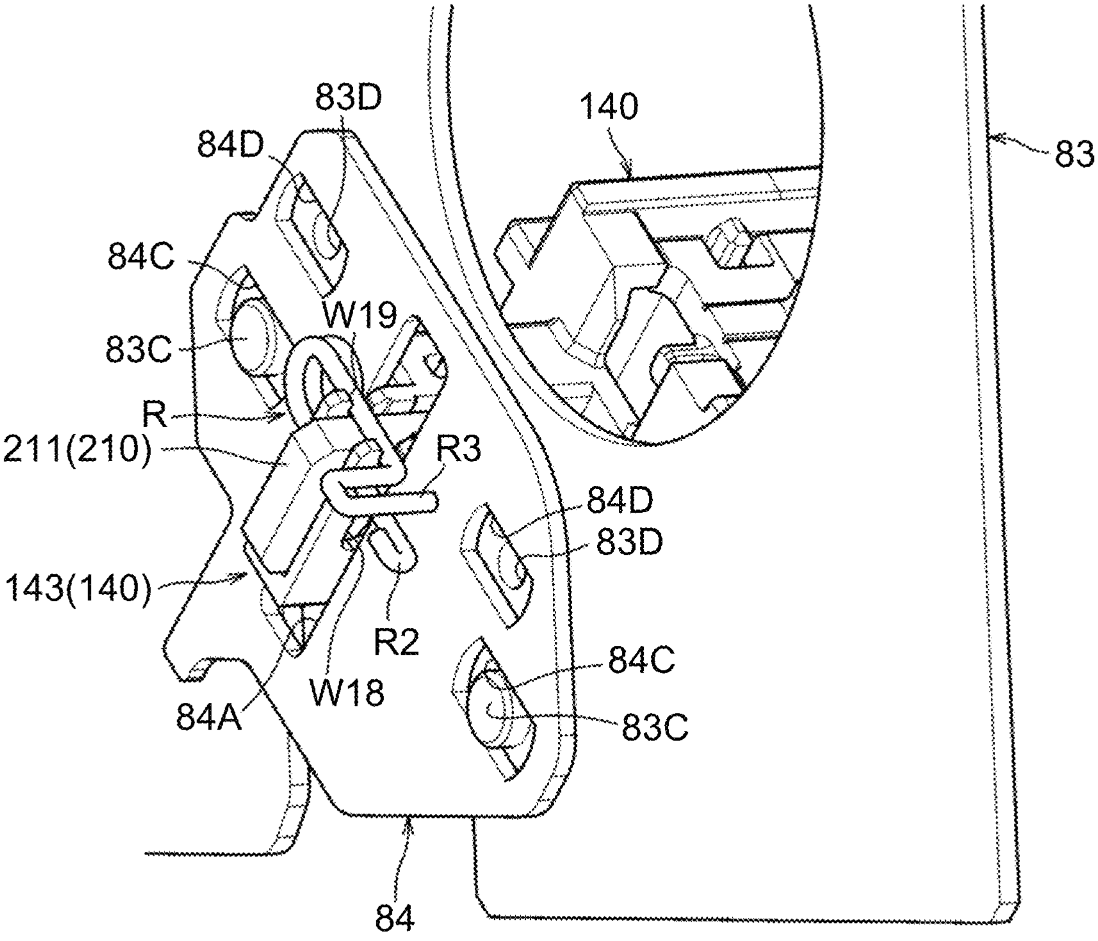
FIG. 14 is a perspective view of the holder, the first stay, a movement restriction member, and a bracket that are assembled.

As illustrated in FIG. 14, the first arm R2 of the movement restriction member R is inserted into and engages with the through hole W18 in each pinching wall W12 and the through hole Hi in the first stay 210. The second arm R3 of the movement restriction member R engages in the recess W19 of each pinching wall W12.

The engaging portion 142 located at the first end in the width direction is identical in structure to the engaging portion 143 located at the second end except that the engaging portion 142 is devoid of the through hole W18 and the recess W19.

Figure 7:
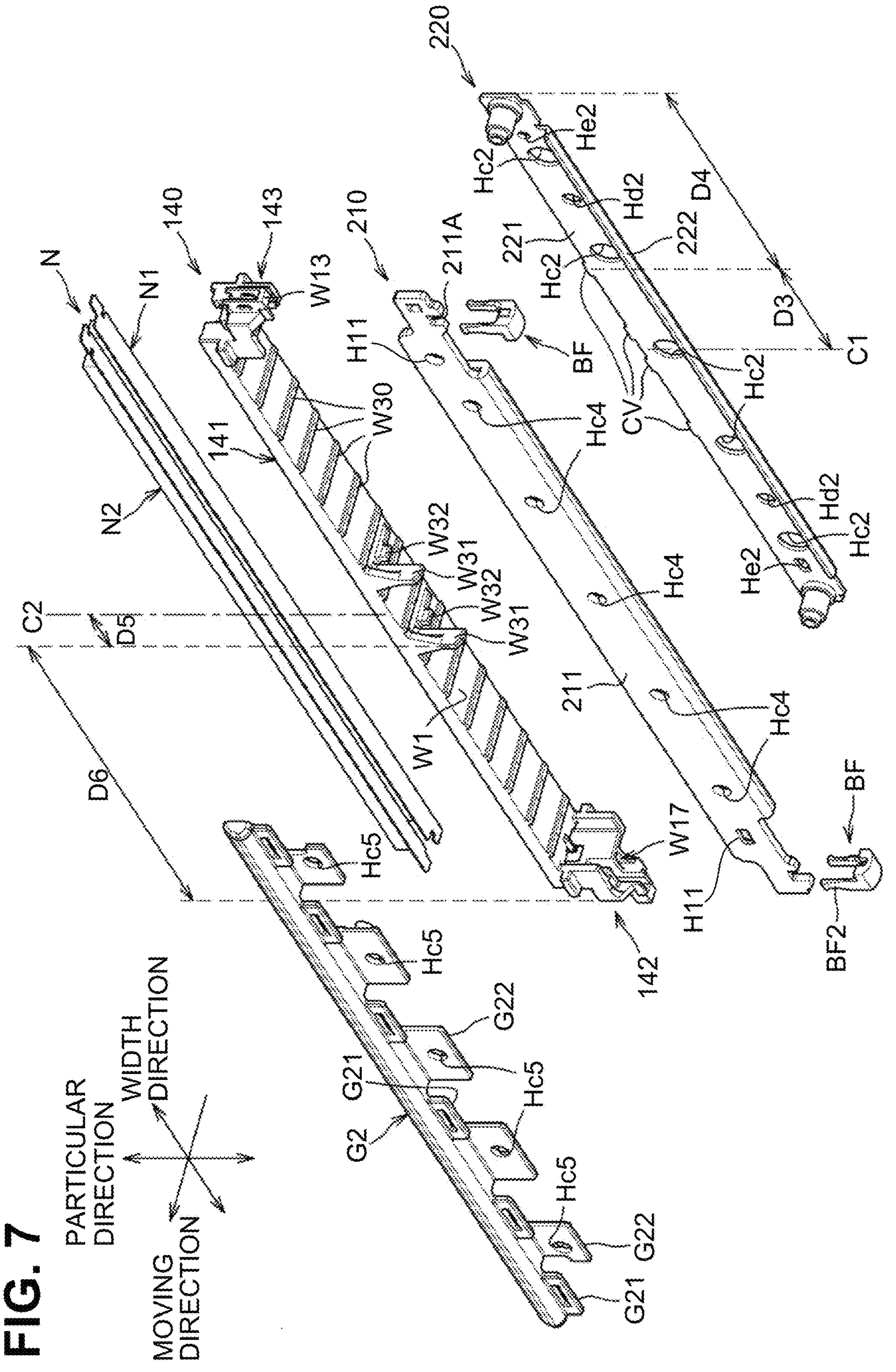
FIG. 7 is an exploded perspective view of the nip forming member, the holder, a first stay, a second stay, and a downstream guide, viewed toward the rotator.

As illustrated in FIG. 7, the holder body 141 further includes 16 ribs W30, two first extension walls W31, and two second extension walls W32. The ribs W30 protrudes from a surface of the support wall W1 opposite to the nip forming member N.

The ribs W30 extend in the moving direction and are spaced from one another in the width direction. A distance between adjacent two of the ribs W30 is smaller than a distance between the two first extension walls W31. The ribs W30 are located symmetrically about a center C2 of the holder 140 in the width direction. The ribs W30 each contact at least the first stay 210.

The base portion 211 of the first stay 210 contacts all of the ribs W30. The second stay 220 contacts some of the ribs W30. The second stay 220 has four protrusions CV to contact four of the ribs W30.

The protrusions CV protrude from an end, facing the holder 140, of the base portion 221 of the second stay 220 along the particular direction. The protrusions CV are located symmetrically about a center C1 of the second stay 220 in the width direction. A distance D3 from the center C1 of the second stay 220 to the farthest protrusion CV from the center C1 in the width direction is smaller than a distance D4 from the farthest protrusion CV to an end of the second stay 220 in the width direction. In FIG. 7, a correlation between the distances is represented relative to the farthest protrusion CV from the center C1. The correlation between the distances is satisfied for the closest protrusion CV to the center C1.

The base portion 221 of the second stay 220 has a plurality of holes Hc2, Hd2, He2, which will be described later. The protrusions CV are located at positions different from the holes Hc2, Hd2, He2.

The two first extension walls W31 are located symmetrically about the center C2 of the holder 140 in the width direction. The second extension walls W32 are spaced upstream from the respective first extension walls W31 in the moving direction. The first extension walls W31 and the second extension walls W32 are located closer to the center C2 of the holder 140 (i.e., the holder body 141) in the width direction than the engaging portion 142. A distance D5 from the center C2 of the holder 140 to a first extension wall W31 or a second extension wall W32 in the width direction is smaller than a distance D6 from the first extension wall W31 or the second extension wall W32 to the engaging portion 142.

In FIG. 7, a correlation between the distances is represented by the extension walls W31, W32 and the engaging portion 142 disposed on a left half of the holder 140 relative to the center C2. The correlation between the distances is satisfied for the extension walls W31, W32 and the engaging portion 143 that are disposed on a right half of the holder 140 relative to the center C2 in the drawing.

Figure 8A:
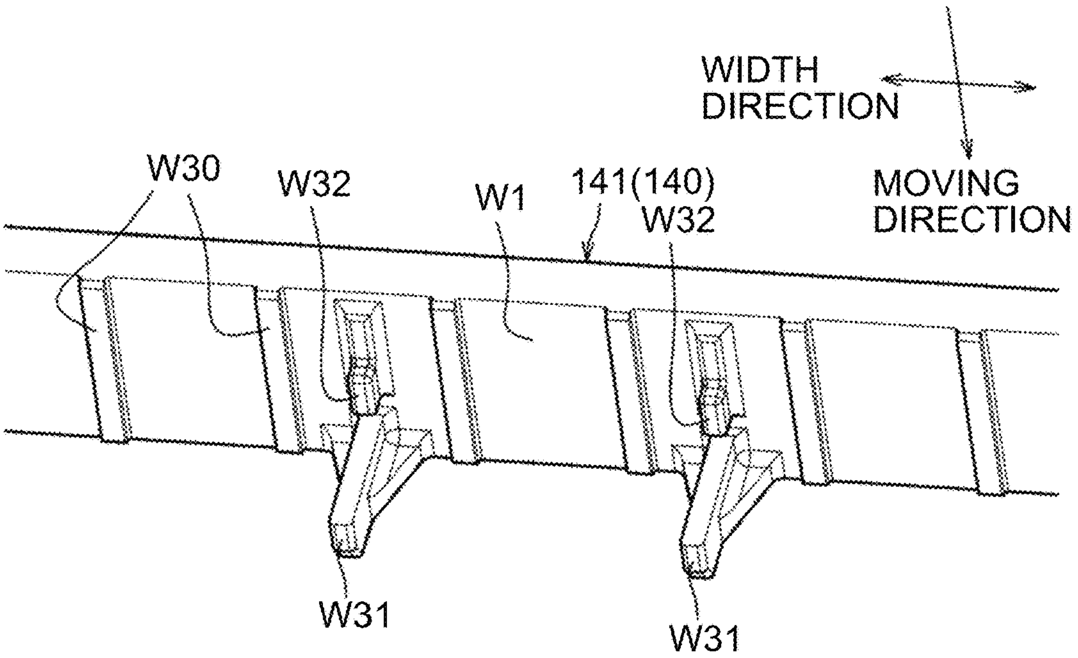
FIG. 8A is a perspective view of a side of a holder body opposite to the rotator.
Figure 8B:
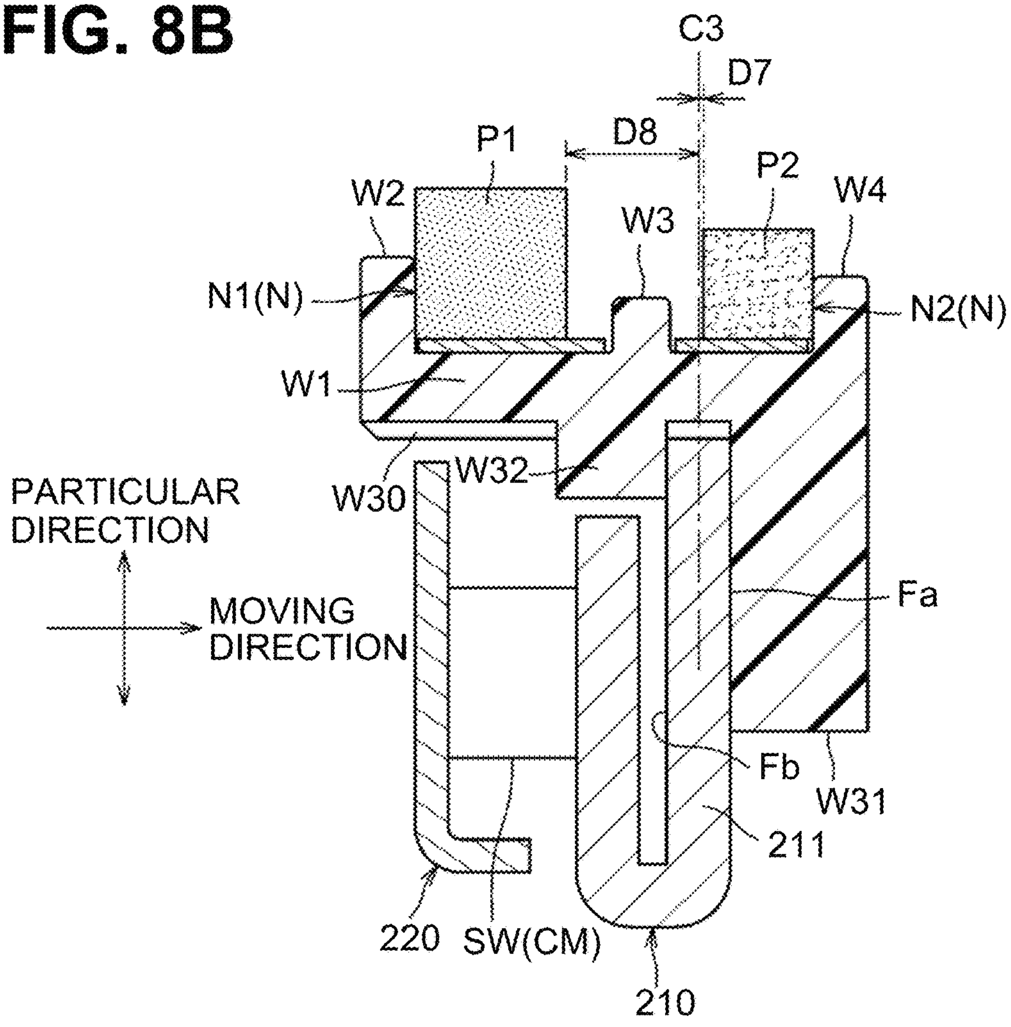
FIG. 8B is a cross sectional view illustrating the relationship between extension walls and the first stay.

As illustrated in FIGS. 8A and 8B, the first extension walls W31 are located at the downstream end of the support wall W1 and extend from the support wall W1 toward a side opposite to the nip forming member N. The first extension walls W31 extend toward the side opposite to the nip forming member N further than the second extension walls W32. The first extension walls W31 contact the downstream surface Fa of the base portion 211 of the first stay 210.

The second extension walls W32 extends from the support wall W1 toward the side opposite to the nip forming member N. The second extension walls W32 extend toward the side opposite to the nip forming member N further than the ribs W30. The second extension walls W32 contact the upstream surface Fb of the base portion 211 of the first stay 210. The first extension walls W31 and the second extension walls W32 sandwich the base portion 211 therebetween in the moving direction.

As illustrated in FIG. 8B, the base portion 211 of the first stay 210 is located to the downstream nip forming member N2 in the moving direction. More specifically, in the moving direction, a distance D7 from a center C3 of the base portion 211 in the width direction to an upstream end of the downstream pad P2 is smaller than a distance D8 from the center C3 of the base portion 211 to a downstream end of the upstream pad P1.

Figure 9A:
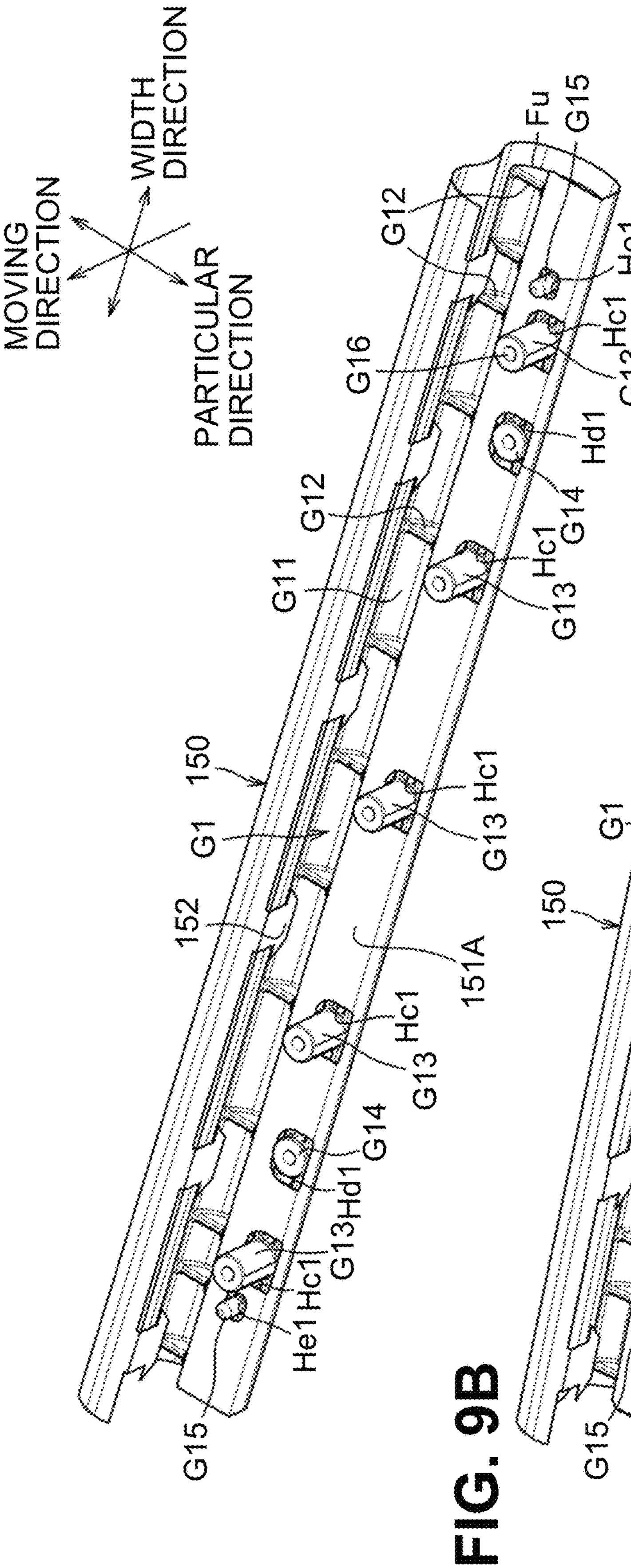
FIG. 9A is a perspective view of an upstream guide viewed from a downstream side in a moving direction, wherein an upstream end portion of a sliding sheet is engaged with the upstream guide.

As illustrated in FIG. 9A, the upstream guide G1 includes a peripheral wall G11, a plurality of ribs G12, five bosses G13, two fastenings G14, and two protrusions G15. The peripheral wall G11 is arc-shaped in cross section and its outer surface is the upstream guide surface Fu.

Figure 9B:
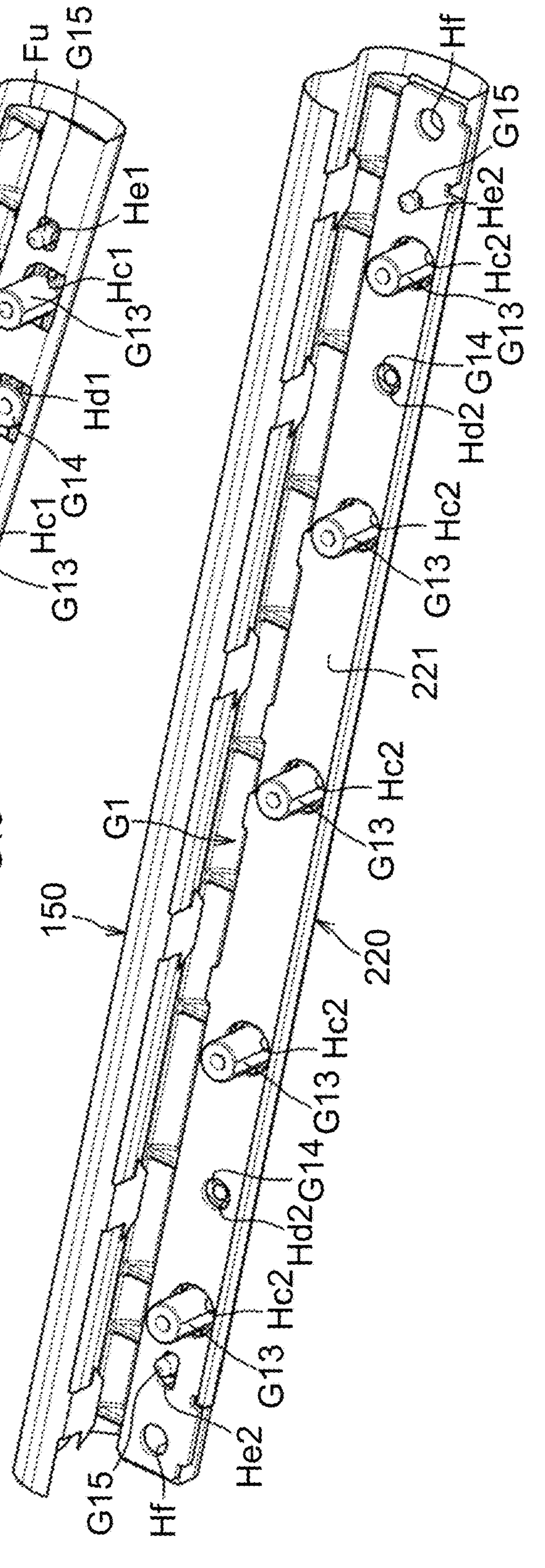
FIG. 9B is a perspective view of the upstream guide viewed from the downstream side in the moving direction, wherein the upstream end portion of the sliding sheet is sandwiched between the upstream guide and the second stay.

The ribs G12 protrudes from a surface of the peripheral wall G11 opposite to the upstream guide surface Fu. Each of the ribs G12 has an end surface to contact the upstream end portion 151A of the sliding sheet 150. The upstream end portion 151A is sandwiched between the end surface of each of the ribs G12 and the second stay 220 (FIG. 9B).

The bosses G13, the fastenings G14, and the protrusions G15 protrude downstream in the moving direction from the surface of the peripheral wall G11 opposite to the upstream guide surface Fu. The bosses G13, the fastenings G14, and the protrusions G15 are spaced from one another in the width direction. The bosses G13, the fastenings G14, and the protrusions G15 are cylindrical. The bosses G13, the fastenings G14, and the protrusions G15 are at the same positions as the ribs G12 in the width direction.

The protrusions G15 protrudes downstream in the moving direction further than the fastenings G14. The bosses G13 protrudes downstream in the moving direction further than the protrusions G15.

Figure 10B:
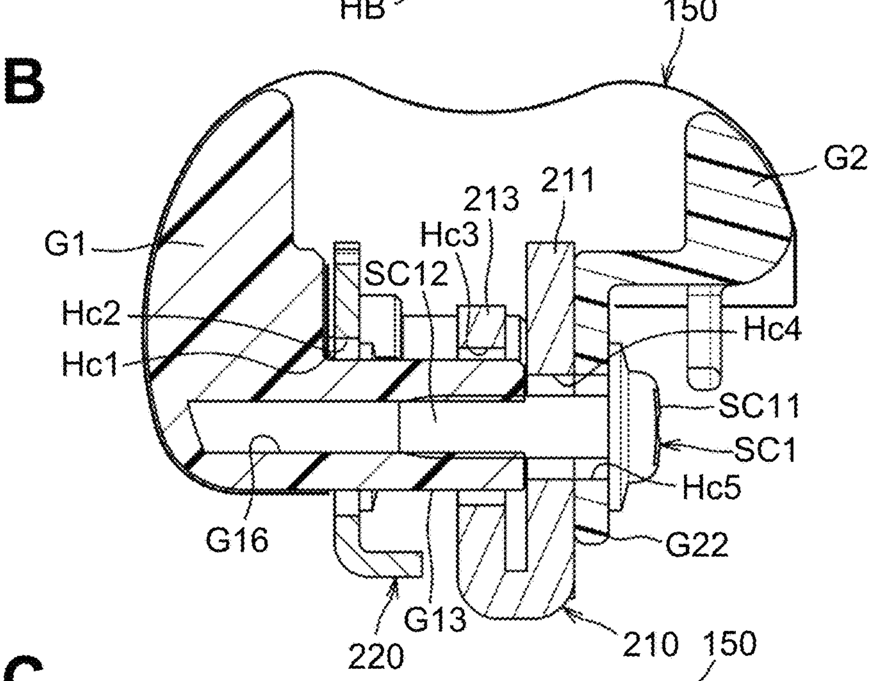
FIG. 10B is a cross sectional view illustrating the structure fastening the upstream guide, the first guide, and the downstream guide.

The bosses G13 fix the upstream guide G1 to the first stay 210 together with the downstream guide G2 (refer to FIG. 10B). The bosses G13 are spaced from one another in the width direction. The bosses G13 are disposed at different positions from the upstream guide surface Fu. More specifically, the bosses G13 are disposed on the surface of the peripheral wall G11 opposite to the upstream guide surface Fu. The bosses G13 are disposed at an end of the upstream guide G1 opposite to the rotator 120 in the particular direction.

Figure 10C:
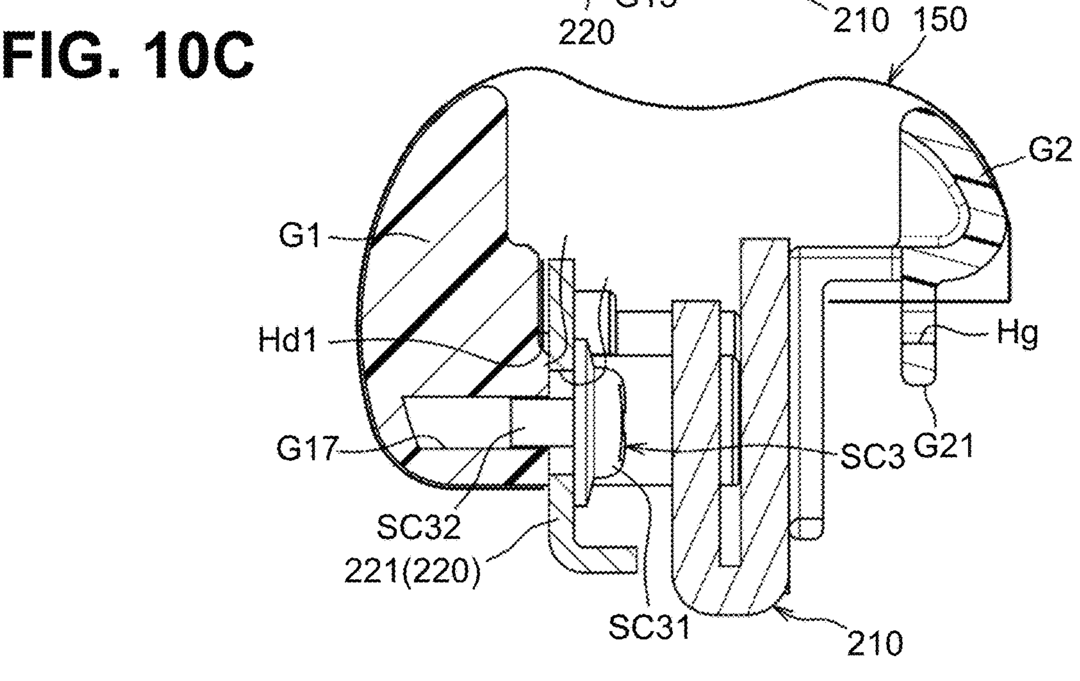
FIG. 10C is a cross sectional view illustrating the structure fastening the upstream guide and a second stay.

The fastenings G14 fix the upstream guide G1 to the second stay 220 (refer to FIG. 10C). One fastening G14 is disposed between the outermost boss G13, which is disposed to one end of the upstream guide G1, of the five bosses G13 and its adjacent boss G13 in the width direction. The other fastening G14 is disposed between the outermost boss G13, which is disposed to the other end of the upstream guide G1, of the five bosses G13, and its adjacent boss G13 in the width direction.

The protrusions G15 position the upstream guide G1 to the second stay 220. Each of the protrusions G15 is located at a corresponding one of both end portions of the upstream guide G1. More specifically, the five bosses G13 are disposed between the two protrusions G15 in the width direction.

The upstream end portion 151A of the sliding sheet 150 has five engagement holes Hc1 formed in a one-to-one correspondence with the five bosses G13, two holes Hd1 formed in a one-to-one correspondence with the two fastenings G14, and two holes He1 formed in a one-to-one correspondence with the two protrusions G15. The holes Hc1, Hd1, He1 are long in the width direction.

Each of the engagement holes Hc1 is where a corresponding one of the bosses G13 engages. After the holes Hc1 and the bosses G13 engage each other, the upstream end portion 151A of the sliding sheet 150 is sandwiched and fixed between the upstream guide G1 and the second stay 220 as illustrated in FIG. 9B.

The base portion 221 of the second stay 220 has five holes Hc2 formed in a one-to-one correspondence with the five bosses G13, two holes Hd2 formed in a one-to-one correspondence with the two fastenings G14, and two holes He2 formed in a one-to-one correspondence with the two protrusions G15. Each of the holes Hc2 is larger than the outside diameter of a corresponding one of the bosses 13.

Each of the holes Hd2 is through which a shank SC32 of a third screw SC3 (refer to FIG. 10C) passes. Each of the holes Hd2 is smaller than the outside diameter of each of the fastenings 14 and larger than the shank SC32 of the third screw SC3.

One of the holes He2 is a round hole and the other one is a long hole which is long in the width direction. This reduces distortion of the upstream guide G1 in the width direction, which may result from thermal expansion of resin for the upstream guide G1 with heat from the metal-made second stay 220.

The base portion 221 further has two holes Hf for fixing the crimped members SW (FIG. 3), one at each of its both ends. The holes Hc2, Hd2, He2 are located between the two holes Hf in the width direction.

As illustrated in FIG. 3, the upstream wall 213 of the first stay 210 has five first holes Hc3 formed in a one-to-one correspondence with the five bosses G13. As illustrated in FIG. 10B, each boss G13 passes through a corresponding one of the first holes Hc3. Each of the first holes Hc3 is larger than the outside diameter of a corresponding one of the bosses 13. The first holes Hc3 are long in the width direction.

As illustrated in FIG. 12, the base portion 211 of the first stay 210 has five second holes Hc4 formed in a one-to-one correspondence with the five bosses G13. The second holes Hc4 are located at positions different from the ribs W30 in the width direction. As illustrated in FIG. 10B, a second hole Hc4 is through which a shank SC12 of the first screw SC1 passes to fix the downstream guide G2 to the base portion 211 of the first stay 210. The second hole Hc4 is larger than the outside diameter of the shank SC12 of the first screw SC1.

As illustrated in FIG. 7, the downstream guide G2 has five holes Hc5 formed in a one-to-one correspondence with the five bosses G13. As illustrated in FIG. 10B, a hole Hc5 is through which the shank SC12 of the first screw SC1 passes. The hole Hc5 is larger than the outside diameter of the shank SC12 of the first screw SC1.

The downstream guide G2 has five fixing portions G22. Each of the fixing portions G22 has a hole Hc5. The fixing portions G22 fix the downstream guide G2 to the base portion 211 of the first stay 210. The fixing portions G22 are located upstream from the six hook engaging portions G21 in the moving direction. The fixing portions G22 are spaced from one another in the width direction and are each located between adjacent two of the hook engaging portions G21.

As illustrated in FIG. 10B, a boss G13 has, at its downstream end in the moving direction, a screw hole G16 in which the first screw SC1 is screwed. The screw hole G16 has a closed end or is recessed with an opening on one side. The boss G13 and screw hole G16 together with the screw SC1 is an example of a connector that connects the upstream guide G1 and the downstream guide G2 to the first stay 210.

The screw hole G16 may be defined by a grooved inner surface of each cylindrical boss G13. Alternatively, the screw hole G16 may be defined by an inner surface of each cylindrical boss G13 to be grooved by a first screw SC1 screwed into each cylindrical boss G13. The same is applied to a screw hole G17 (FIG. 10C), which will be described later.

Each boss G13 passes through the holes Hc1, Hc2, Hc3 and contacts the base portion 211 of the first stay 210. Each boss G13 is disposed in the holes Hc2, Hc3 with a spacing from their edges in a state where the fixing device 8 is assembled.

Each first screw SC1 is screwed, through the holes Hc5, Hc4, into the screw hole G16 of a boss G13. The downstream guide G2 and the base portion 211 of the first stay 210 are thus pinched between the end of each boss G13 and a head SC11 of each first screw SC1. In other words, the upstream guide G1 and the downstream guide G2 are fixed to the base portion 211 by tightening each first screw SC1 in a state where the end of each boss G13 and each fixing portion G22 of the downstream guide G2 sandwich the base portion 211 of the first stay 210. In short, the upstream guide G1, the first stay 210, and the downstream guide G2 are fastened together with the five first screws SC1. Each of the first screws SC1 screwed at the end of a corresponding boss G13 is disposed in the holes Hc5, Hc4 with a spacing from their edges.

As illustrated in FIG. 10C, each fastening G14 has, at its downstream end in the moving direction, a screw hole G17 in which a third screw SC3 is screwed. The screw hole G17 has a closed end or is recessed with an opening on one side.

Each fastening G14 passes through a hole Hd1 in the sliding sheet 150 and contacts the base portion 211 of the second stay 220. Each third screw SC3 is screwed, through the hole Hd2 in the base portion 221 of the second stay 220, into the screw hole G17 of a fastening G14. The base portion 221 of the second stay 220 is pinched between an end of each of the two fastenings G14 and a head SC31 of a corresponding one of the two third screws SC3, and the upstream guide G1 is fixed to the second stay 220 with the two third screws SC3.

Figure 11:
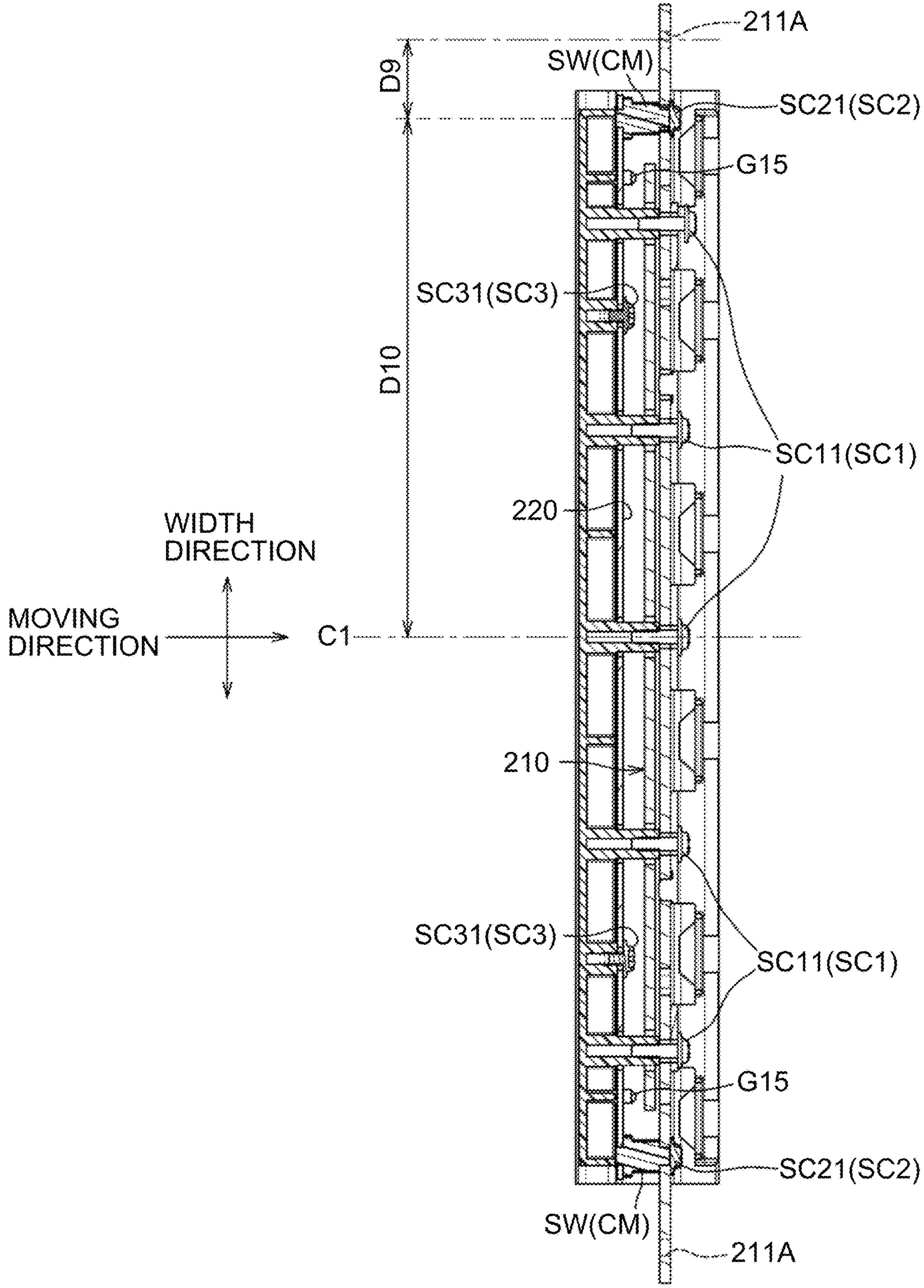
FIG. 11 is a cross sectional view of a pressure unit viewed in a direction orthogonal to a particular direction, illustrating the positional relationship between screws.

As illustrated in FIG. 11, heads SC11 of the first screws SC1, heads SC21 of the second screws SC2, and heads SC31 of the third screws SC3 face downstream in the moving direction. The protrusions G15 are located farther from the center C1 of the second stay 220 in the width direction than the first screws SC1.

The connectors CM are located closer to the load receivers 211A than to the center C1 of the first stay 210 in the width direction. The center of the second stay 220 in the width direction and the center of the first stay 210 in the width direction are at the same positions in the width direction, and thus indicated with the same reference number "C1".

More specifically, each of the connectors CM is located between the center C1 of the first stay 210 and one of the load receivers 211A in the width direction. The two connectors CM are located symmetrically about the center C1 of the first stay 210 in the width direction. A distance D9 from one connector CM to its adjacent load receiver 211A in the width direction is smaller than a distance D10 from the connector CM to the center C1 of the first stay 210 in the width direction.

As illustrated in FIG. 13, the fixing device 8 includes a side frame 83, a bracket 84, and a pressure mechanism 300 at each of its both ends in the width direction.

The side frame 83 supports the heating unit 81 and the pressure unit 82. The side frame 83 is made of metal. The side frame 83 has a spring engaging portion 83A and a recess 83B. The spring engaging portion 83A engages one end of an urging member 320, which will be described later. The recess 83B allows an end of the base portion 211 of the first stay 210 in the width direction to pass.

The side frame 83 further has two protrusions 83C and two holes 83D. The protrusions 83C position the bracket 84. The protrusions 83C are located at opposite positions relative to the recess 83B in the moving direction. The holes 83D are formed at opposite positions relative to the recess 83B in the moving direction.

The bracket 84 has a first long hole 84A, two second long holes 84C, and two third long holes 84D. The first long hole 84A supports the first stay 210 movably in the particular direction. The first long hole 84A is long in the particular direction. The engaging portion 143 of the holder 140 engages with the first long hole 84A (refer to FIG. 14).

The second long holes 84C and the third long holes 84D are long in the moving direction. The second long holes 84C are formed at opposite positions relative to the first long hole 84A in the moving direction. The third long holes 84D are formed at opposite positions relative to the first long hole 84A in the moving direction.

Each of the protrusions 83C is engageable with a corresponding one of the second long holes 84C. In a state where the protrusions 83C engage in the second long holes 84C, the bracket 84 is movable relative to the side frame 83 in the moving direction. The bracket 84 is positioned to the side frame 83 by aligning the first long hole 84A with a specified mark, for example, on the side frame 83, and the pressure unit 82 is thus appropriately positioned to the side frame 83.

Thereafter, the positioned bracket 84 is fixed to the side frame 83 by tightening screws in the third long holes 84D and the holes 83D. The movement restriction member R contacts an outer surface of the bracket 84 in the width direction (refer to FIG. 14). The holder 140 and the first stay 210 are thus positioned to the side frame 83 in the width direction.

The pressure mechanism 300 includes a pressure arm 310 and an urging member 320.

The pressure arm 310 presses the first stay 210 via a buffer BF. The pressure arm 310 is a L-shaped plate-like member made of metal. The pressure arm 310 has a hole 311, a spring engaging portion 312, and an engagement hole 313.

The hole 311 is formed at one end of the pressure arm 310. The pressure arm 310 is supported at the side frame 83 rotatably about the hole 311. The spring engaging portion 312 is located at the other end of the pressure arm 310 and engages with an end of the urging member 320. The engagement hole 313 is formed near a bend portion of the pressure arm 310 and engages the buffer BF.

The urging member 320 urges the first stay 210 toward the rotator 120. In this embodiment, the urging member 320 is a helical tension spring.

As illustrated in FIG. 15, a cam 85 is disposed rotatably on the side frame 83. The cam 85 is rotatable to switch the state of the fixing device 8 between a nip state and a nip release state.

In the nip state (FIG. 2), a specified nip pressure is applied to between the heating unit 81 and the pressure unit 82. In the nip release state, no nip pressure or a nip pressure smaller than the specified nip pressure is applied to between the heating unit 81 and the pressure unit 82.

While the cam 85 is separated from the pressure arm 310, the fixing device 8 is in the nip state. When the cam 85 rotates counterclockwise by substantially 90 degrees from the position illustrated in FIG. 15, the pressure arm 310 also rotates counterclockwise against an urging force from the urging member 320, and thus the fixing device 8 enters the nip release state.

Technical advantages of the fixing device 8 according to the illustrative embodiment will now be described.

As illustrated in FIGS. 2 and 4B, in the nip state, the two springs SP urge the fixing plates B1, B2 toward the walls W2, W4, and the pads P1, P2 contact the walls W2, W4 to restrict movements of the nip forming members N1, N2. Similarly, in the nip release state, the pads P1, P2 contact the walls W2, W4 to restrict movements of the nip forming members N1, N2. This may stabilize the positions of the nip forming members N1, N2 relative to the holder 140 while the nip state and the nip release state are repeatedly switched. This may also stabilize the position of the nip NP including the upstream nip NP1 and the downstream nip NP2.

The nip forming members N1, N2 may have manufacturing deviations, such as positional deviations of the pads P1, P2 caused when attached to the fixing plates B1, B2. Even in this case, however, the urging forces of the two springs SP allow the pads P1, P2 to contact the walls W2, W4, thus holding the pads P1, P2 in position relative to the holder 140 and stabilizing the positions of the nips NP1, NP2.

Both ends of each fixing plate B1, B2 in the width direction are urged toward the support wall W1 by the respective springs SP. In this embodiment, the support surfaces F1, F2 of the support wall W1 protrude toward the rotator 120, and the nip forming members N1, N2 become deformed along the shapes of the support surfaces F1, F2. After assembly of the fixing device 8, the surfaces of the pads P1, P2 facing the rotator 120 becomes curved. This eliminates the need to manufacture the pads P1, P2 to have curved surfaces facing the rotator 120. The holder 140 made of resin is less subject to manufacturing deviations than the pads P1, P2 made of rubber, thus reducing fluctuations on the pressure distribution at the nip NP in the width direction efficiently, unlike the case where the pads P1, P2 are manufactured to have curved surfaces facing the rotator 120.

From the above description, the illustrative embodiment may have the following advantages.

The nip forming members N1, N2 are urged in contact with the respective walls W2, W4. This may stabilize the positions of the nips NP1, NP2 regardless of manufacturing deviations of the nip forming members N1, N2 and repeated switching between the nip state and the nip release state. Each spring SP has a coil portion S1 of one or more turns of wire, which may prevent or reduce the spring SP, when compressed into between the nip forming members N1, N2, from undergoing plastic deformation, as compared to a differently shaped spring, for example, a V-shaped leaf spring.

The springs SP contact the fixing plates B1, B2, not the pads P1, P2 located thereon. This may prevent the springs SP from deforming the pads P1, P2 and thus stabilize the positions of the nips NP1, NP2.

The holder 140 includes the bosses W6 to be inserted into the coil portions S1 of the respective springs SP. The spring SP are attachable to the holder 140 simply by attaching the coil portions S1 to the bosses W6, which facilitates installation of the springs SP.

Each of the bosses W6 is located at a position farther from the rotator 120 than the fixing plates B1, B2 in the particular direction. This positional relationship may enable each spring SP to urge the nip forming members N1, N2 against the holder 140 and thus prevent or reduce the nip forming members N1, N2 from falling out of the holder 140 at the installation.

In the above embodiment, the boss W6 is located, in the moving direction, between the end portion B11 of the upstream fixing plate B1 and the end portion B21 of the downstream fixing plate B2. A distance in the moving direction between the end portion B11 of the upstream fixing plate B1 and the end portion B21 of the downstream fixing plate B2 is greater than the outside diameter of a coil portion S1. The coil portion S1 of each spring SP is attachable to a corresponding boss W6 between the upstream fixing plate B1 and the downstream fixing plate B2, which improves the installation of the springs SP. The springs SP are used to press the fixing plates B1, B2 against the holder 140. This structure prevents or reduces the nip forming members N1, N2 from falling out of the holder 140 and reduces fluctuations on the nip pressure distribution.

In the above embodiment, the dimension for the recess W7 in the moving direction is greater than the outside diameter of the coil portion S1. The coil portion S1 of each spring SP is attachable to a corresponding boss W6 through the recess W7, which improves the installation of the springs SP.

Each of the protrusions W10, W11 has a portion located at the same position as the arm S2, S3 in the moving direction. Each of the bosses W6 extends to a position overlapping the protrusions W10, W11 in the width direction. The protrusions W10, W11 may prevent the springs SP from being inclined or falling out of the bosses W6 at the installation.

The restriction protrusions W21, W24 engage in the restriction recesses B14, B24 of the fixing plates B1, B2 to restrict movements of the fixing plates B1, B2 in the width direction. The restriction recesses B14, B24 and the restriction protrusions W21, W41 are located between each end of the pads P1, P2 and a corresponding one of the bosses W6 in the width direction. This prevents the fixing device 8 from upsizing, unlike, for example, the structure including the restriction recesses and the restriction protrusions that are located at outer positions relative to the bosses in the width direction.

Each spring SP has the bend portions S4 at the ends of the arms S2, S3. In a case where the spring SP is held in compression with tweezers, for example, the bend portions S4 are used to allow engaging of the ends of tweezers so that the spring SP may be prevented from falling out of tweezers.

The bend portions S4 are ring-shaped. In a case where the spring SP is held in compression with tweezers, the bend portions S4 allow passing of the ends of tweezers through the respective rings so that the spring SP may be prevented from falling out of tweezers more reliably.

The upstream guide G1, the first stay 210, and the downstream guide G2 are fastened together with the first screws SC1. This reduces the number of screws required, unlike, for example, the structure where the upstream guide is fastened to the first stay with screws and then the downstream guide is fastened to the first stay with other screws.

Each boss G13 is disposed in a corresponding first hole Hc3 formed in the first stay 210 with a spacing left from the edges of the first hole Hc3. This prevents the first stay 210 from contacting the bosses G13 even when the first stay 210 becomes deformed, and thus prevents the upstream guide G1 from becoming deformed.

Each of the screw holes G16 has a closed end or is recessed with an opening on one side. The screw holes G16 may hold therein chips or shavings left after the first screws SC1 are screwed into the screw holes G16.

The load receivers 211A are located one at each end of the first stay 210 in the width direction, and the first stay 210 may have a greater likelihood of deformation at its center in the width direction than at its each end. The connectors CM are located closer to the load receivers 211A than to the center of the first stay 210 in the width direction. This prevents deformation of the second stay 220, unlike, for example, the structure including the connectors located closer to the center of the first stay in the width direction.

Each of the connectors CM is located between the center C1 of the first stay 210 and one of the load receivers 211A in the width direction. This reduces the length of the second stay 220 in the width direction and the weight of the fixing device 8, unlike, for example, the structure including the connectors located at the same positions of the load-receivers.

The crimped members SW are crimped to the second stay 220. This maintains a flatness of the first stay 210 where loads are applied, unlike, for example, the structure including the crimped members crimped to the first stay.

The upstream guide G1 is fixed to the first stay 210 with the first screws SC1 and to the second stay 220 with the third screws SC3. The upstream guide G1 is thus securely supported by the stays 210, 220.

The screwed screws SC1, SC2, SC3 have their heads SC11, SC21, SC31 all facing downstream in the moving direction. In other words, the screws SC1, SC2, SC3 are screwed in the same direction, thus facilitating assembling of components using the screws. Unlike this embodiment, for example, if at least one first screw is screwed with its head facing upstream in the moving direction, the upstream guide should have a through hole formed therein to recess the head of the first screw. In this case, a perimeter of the through hole in the upstream guide surface of the upstream guide may become an edge that may impart a resistance to the circulation of the belt. In this embodiment, however, all of the first screws SC1 are screwed with their heads SC11 facing downstream in the moving direction. This eliminates the need to form through holes in the upstream guide G1 to recess the heads SC11 of the first screws SC1, and prevents the formation of edges on the upstream guide surface Fu.

The upstream guide G1 includes the positioning protrusions G15 at outer positions relative to any of the first screws SC1 in the width direction. This prevents or reduces the upstream guide G1 from being obliquely assembled to the second stay 220, unlike, for example, the structure including each positioning protrusion sandwiched between the first screws in the width direction.

The first stay 210 and the second stay 220 are separate from each other and contact the holder 140 independently of each other. This allows accurate positioning of contact surfaces of the respective stays 210, 220 to contact the holder 140 and reduces fluctuations on the nip pressure, unlike, for example, a structure including a U-shaped stay with its ends to contact the holder. The first stay 210 includes the bend portion HB. This structure improves stiffness of the first stay 210 and allows the holder 140 to appropriately receive the force of the urging member 320. The two connectors CM are located at positions different from the bend portion HB to prevent a loss of strength in a portion of the base portion 211 having stiffness increased by the bend portion HB.

The second stay 220 includes the protrusions CV located at positions different from the holes Hc2, Hd2, He2. This structure reduces deformation of the second stay 220 due to pressure applied from the holder 140 to the protrusions CV, and thus reduces fluctuations on the nip pressure distribution.

The first stay 210 has both ends where loads are applied. The both ends of the first stay 210 engage with the engaging portions 142, 143 and the first stay 210 is thus directly positioned to the holder 140. This structure stabilizes the positioning accuracy of the holder 140 in the moving direction relative to the first stay 210 subjected to loads and thus reduces uneven nip pressure distribution.

The first connecting wall W13 is located opposite to the rotator 120 relative to an end of the first stay 210 in the width direction and in contact with the first stay 210. The first stay 210 is sandwiched between the holder body 141 and the first connecting wall W13 in a direction in which loads are applied (i.e., the particular direction). This structure stabilizes the positioning accuracy of the holder 140 relative to the first stay 210. This structure also allows temporary assembly of the holder 140 and the first stay 210, which reduces the need to increase the number of assembly processes.

The holder 140 includes the second connecting wall W14 that connects a pair of pinching walls W12, thus increasing stiffness of each of the engaging portions 142, 143.

In this embodiment, the second connecting wall W14 is spaced from the first stay 210. This structure reduces the nip pressure distribution from varying in the width direction, unlike, for example, a structure where the second connecting wall contacts the first stay.

The pinching walls W12 are reinforced with the reinforcing portions WA to increase stiffness of the engaging portions 142, 143.

The first extension walls W31 contact the downstream surface Fa of the first stay 210 to prevent the holder 140 from being inclined downstream in the moving direction.

The second extension walls W32 contacts the upstream surface Fb of the first stay 210 to thereby sandwich the first stay 210 between the first extension walls W31 and the second extension walls W32. This structure prevents deformation and distortion of the holder 140 in the moving direction.

The first extension walls W31 and the second extension walls W32 are located closer to the center C2 of the holder body 141 in the width direction than to the engaging portions 142, 143, thus reducing deformation at the center of the holder 140 in the moving direction.

The movement restriction member R is inserted into the through holes Hi in the first stay 210 and the through holes W18 of the pair of pinching walls W12 to position the first stay 210 relative to the holder 140 in the width direction.

The ribs W30 are placed in contact with the first stay 210. This improves accuracy of a contact between the holder 140 and the first stay 210 and distributes the nip pressure uniformly in the width direction, unlike, for example, the structure where the holder has a flat surface long in the width direction to be placed in contact with the entire contact surface of the first stay. Each of the ribs W30 extends in the moving direction. This facilitates deformation of the support wall W1 along the first stay 210, unlike, for example, the structure where the ribs are long in the width direction, and thus distributes the nip pressure uniformly in the width direction. The contact surface Ft of the first stay 210 may be arcuate when viewed in the moving direction, with its center in the width direction protruding toward the holder 140 further than its ends. This case may achieve the above described advantages.

The first stay 210 receiving a force from the urging member 320 is disposed to the downstream nip forming member N2, thus maintaining the nip pressure of the downstream nip NP2 appropriately. To remove a sheet S from the rotator 120, the downstream nip forming member N2 has a maximum pressure higher than the upstream nip forming member N1. As the first stay 210 is disposed to the downstream nip forming member N2, such a maximum pressure may be obtained reliably.

The second stay 220 includes the protrusions CV to contact some of the ribs W30. The first stay 210 and the second stay 220 thus support the support wall W1 reliably.

The protrusions CV are located to the center C1 of the second stay 220 in the width direction, thus preventing the center of the support wall W1 in the width direction from becoming deformed toward the second stay 220.

The first stay 210 has the second holes Hc4 located at positions different from the ribs W30 in the width direction. In other words, the second holes Hc4 are absent at portions of the first stay 210 where the first stay 210 receives reaction forces from the ribs W30. This structure thus reduces deformation of the first stay 210 and keeps the nip pressure stably.

The sliding sheet 150 has the elastically deformable hooks 152, which are easily engageable in the apertures Hg in the hook engaging portions G21. This facilitates attaching the sliding sheet 150.

The end portion 152A of each hook 152 has a minimum width smaller than a width of a corresponding aperture Hg and a maximum width greater than the width of the aperture Hg. This allows easy insertion of each hook 152 into the aperture Hg and reduces the tendency of each hook 152 to come out of the aperture Hg.

The neck portion 152B of each hook 152 has a length greater than a thickness of a corresponding hook engaging portion G21, thus allowing fixing of the downstream end portion 151B of the sliding sheet 150 to the downstream guide G2 with sufficient allowance.

Each hook engaging portion G21 is spaced from the first stay 210 by a dimension greater than the length of the end portion 152A. When inserted into the aperture Hg, the end portion 152A of each hook 152 does not contact the first stay 210. This facilitates insertion of the end portion 152A into the aperture Hg.

Each of the fixing portions G22 of the downstream guide G2 is located between adjacent two of the hook engaging portions G21. The hook engaging portions G21 are thus non-obstructive while the downstream guide G2 is fixed to the first stay 210. This facilitates fixing the downstream guide G2 to the first stay 210.

The upstream end of the sliding sheet 150 is subjected to tension, because the belt 130 and the sliding sheet 150 at the nip NP are pulled downstream. However, the downstream end of the sliding sheet 150 is less susceptible to tension. In this embodiment, the sliding sheet 150 has the hooks 152 at the downstream end portion 151B, which is less susceptible to tension. The downstream end portion 151B of the sliding sheet 150 is fixed to the downstream guide G2 by simply engaging the hooks 152 in the apertures Hg, without the need to use fasteners, for example, screws. This structure reduces the need to increase the number of parts and facilitates fixing the downstream end portion 151B of the sliding sheet 150, unlike, for example, the structure using screws to fix the downstream end portion of the sliding sheet.

The holes Hc1 in the upstream end portion 151A of the sliding sheet 150 engage with the bosses G13 on the upstream guide G1, and the upstream end portion 151A of the sliding sheet 150 is sandwiched between the upstream guide G1 and the second stay 220, thereby fixing the upstream end portion 151A of the sliding sheet 150 to the upstream guide G1. This facilitates fixing the upstream end portion 151A of the sliding sheet 150.

The sliding sheet 150 is located covering the upstream guide surface Fu, thus reducing sliding friction between the upstream guide G1 and the belt 130.

While the disclosure has been described in detail with reference to the specific embodiment thereof, various changes, arrangements and modifications may be applied therein as will be described below.

In the illustrative embodiment, the halogen lamp is illustrated as a heater. Examples of the heater include a carbon heater.

In the illustrative embodiment, a cylindrical roller having the heater 110 therein is illustrated as a rotator. Examples of the rotator may include a belt whose inner peripheral surface may be heated by a heater. An outer peripheral surface of the rotator may be heated by a heater disposed outside of the rotator or using an induction heating ("IH") element. A heater may be disposed within an interior space of a belt to indirectly heat the rotator contacting an outer peripheral surface of the belt. A heater may be disposed within an interior space of each of the rotator and the belt.

The above embodiment shows but is not limited to that the sliding sheet 150 is disposed between the belt 130 and the nip forming member N. The sliding member may be omitted. In this case, the nip forming member may be placed in contact with an inner peripheral surface of the belt. A sliding sheet with no hooks may be disposed between the belt and the nip forming member. A sliding sheet may have a downstream end portion as a free end portion fixed by no members.

The above embodiment shows but is not limited to two nip forming members N1, N2.

Instead, one nip forming member may be provided.

The above embodiment shows but is not limited to the nip forming member including pads and fixing plates. The nip forming member may eliminate fixing plates or include pads only. The pads may be made of a hard material, which is resistant to deformation under pressure, such as resin or metal.

The above embodiment shows but is not limited to the restricting members (walls W2, W4) integral with the holder 140. The restricting members may be individual members separate from the holder.

The above embodiment shows but is not limited to two springs SP, each having the bend portions S4 at the ends of the arms S2, S3. Each of the springs may have no bend portions or have a bend portion at one of the arms.

The above embodiment shows but is not limited to the ring-shaped bend portions S4. The bend portions may be arcuate or V-shaped.

The above embodiment shows but is not limited to the connectors CM, each including a crimped member SW and a second screw SC2. The connectors may be components fastened to the stays with screws.

The above embodiment shows but is not limited to that the urging member 320 is a helical tension spring. Examples of the urging member include a helical compression spring, a torsion spring, and a leaf spring.

The above embodiment shows but is not limited to that the movement restriction member R is a torsion spring. Examples of the movement restriction member include a U-shaped wire or plate, and a bolt and a nut.

The above embodiment shows but is not limited to that the second stay 220 has four protrusions CV. The second stay may have at least one protrusion.

The above embodiment shows but is not limited to that holder 140 and the stay 200 function as a supporting member. The support member may be only one of the holder and the stay. The holder and the stay may be integral with each other.

The above embodiment shows but is not limited to the that the belt guide G includes two guides G1, G2. The belt guide may include only one of the upstream guide and the downstream guide. The upstream guide and the downstream guide may be integral with each other.

The above embodiment shows but is not limited to the that the stay 200 includes two stays 210, 220. The stay may include three or more stays.

The above embodiment shows but is not limited to that the sliding sheet 150 has the hooks 152 at the downstream end portion 151B. The sliding sheet may have at least one hook at at least one of the upstream end portion and the downstream end portion.

The above embodiment shows but is not limited to that the downstream guide G2 includes the hook engaging portions G21 engageable with the hooks 152. One of the upstream guide, the holder, the first stay and the second stay may include at least one hook engaging portion.

The above embodiment shows but is not limited to that the end portion 152A of each hook 152 protrudes relative to both ends of the neck portion 152B in the width direction. At least one hook may have an end portion protruding relative to one end of the neck portion 152B in the width direction.

The above embodiment shows but is not limited to that the upstream end portion 151A of the sliding sheet 150 is fixed to the upstream guide G1. The upstream end portion of the sliding sheet may be fixed to one of the holder, the downstream guide, the first stay, and the second stay.

The above embodiment shows but is not limited to that the sliding sheet 150 is located covering the upstream guide surface Fu, the nip forming member N, and the downstream guide surface Fd. The sliding sheet may cover at least the nip forming member. In other words, the belt guide may be placed in contact with an inner peripheral surface of the belt. In other words, the belt guide may be placed in contact with an inner peripheral surface of the belt.

Each of the elements or components which have been described in the illustrative embodiment and modifications may be used in any combination.

What is claimed is:

1. A device for an image forming apparatus, comprising:

a rotator having a rotation axis;

a belt;

a nip forming member surrounded by the belt, the nip forming member configured to, with the rotator, pinch the belt to form a nip;

a holder directly contacting and holding the nip forming member;

a first stay supporting the holder, the first stay extending in a width direction parallel to the rotation axis;

an urging member urging the first stay toward the rotator;

a second stay positioned upstream of the first stay in a moving direction of the belt at the nip, the moving direction being perpendicular to the width direction; and a connector connecting the first stay to the second stay;

wherein the first stay includes:

a base portion that has a first end directly contacting the holder and a second end opposite the first end in a particular direction orthogonal to each of the rotation axis and the moving direction of the belt at the nip; and a bend portion that extends from the second end of the base portion, the bend portion being located at a first area in the width direction, and not being located at a second area in the width direction, wherein a width of the bend portion of the first stay in the width direction is less than a width of the base portion of the first stay in the width direction and wherein the bend portion includes a wall extending parallel to the base portion, and wherein the connector connects the first stay and the second stay at the second area.

2. The device according to claim 1, wherein the wall is located upstream of the base portion in the moving direction of the belt at the nip.

3. The device according to claim 1, wherein the first stay comprises a metal, and wherein the bend portion includes a portion bent by hemming.

4. The device according to claim 1, wherein the connector extends through each of the first stay and the second stay.

5. The device according to claim 1, wherein the second stay is configured to contact the holder.

6. The device according to claim 1, wherein the nip forming member includes an upstream pad and a downstream pad, the upstream pad being located upstream of the downstream pad in the moving direction of the belt at the nip, wherein the device has a gap between the upstream pad and the downstream pad, and wherein the first end of the base portion is closer to the downstream pad than the upstream pad.

7. A device for an image forming apparatus, comprising:

a rotator having a rotation axis;

a belt;

a nip forming member surrounded by the belt, the nip forming member configured to, with the rotator, pinch the belt to form a nip;

a holder having a first side directly contacting the nip forming member;

a first stay supporting the holder, the first stay extending in a width direction parallel to the rotation axis;

an urging member urging the first stay toward the rotator;

a second stay positioned upstream of the first stay in a moving direction of the belt at the nip, the moving direction being perpendicular to the width direction; and a connector connecting the first stay to the second stay;

wherein the first stay includes:

a base portion that has a first end to contact the holder and a second end being located opposite the first end in a particular direction orthogonal to each of the rotation axis and the moving direction of the belt at the nip, the base portion being configured to support the holder in a direction in which the base portion extends; and a bend portion that extends from the second end of the base portion, the bend portion including an upstream wall, the upstream wall extending parallel to the base portion, wherein the upstream wall and the second stay overlap in the moving direction, and wherein the holder includes a second side opposite the first side in the particular direction orthogonal to each of the rotation axis and the moving direction of the belt at the nip, wherein the second side extends in the moving direction of the belt at the nip, and the first end of the base portion directly contacts the second side of the holder.

8. The device according to claim 7, wherein the base portion of the first stay extends in a certain direction perpendicular to each of the width direction and the moving direction, wherein the upstream wall of the first stay extends in the certain direction, and wherein the base portion faces the upstream wall in the moving direction.

9. The device according to claim 7, wherein the upstream wall includes a first end and a second end, the first end being closer to the holder than the second end, and wherein the first end of the upstream wall is farther from the holder than the first end of the base portion.

10. The device according to claim 7, wherein the second stay includes a base portion and an extension portion, the base portion extending parallel to the upstream wall, the extension portion extending toward the first stay from an end of the base portion.

11. The device according to claim 7, wherein the first stay comprises a metal, and wherein the bend portion includes a portion bent by hemming.

12. The device according to claim 7, wherein the connector extends through each of the first stay and the second stay.

13. The device according to claim 7, wherein the second stay is configured to contact the holder.

14. The device according to claim 7, wherein the nip forming member includes an upstream pad and a downstream pad, the upstream pad being located upstream of the downstream pad in the moving direction of the belt at the nip, wherein the device has a gap between the upstream pad and the downstream pad, and wherein the first end of the base portion is closer to the downstream pad than the upstream pad.

15. The device according to claim 7, wherein the nip forming member includes a pad supported by the holder, and wherein the base portion of the first stay overlaps the pad in a direction in which the base portion extends.

16. A device for an image forming apparatus, comprising:

a rotator having a rotation axis;

a belt;

a nip forming member surrounded by the belt, the nip forming member configured to, with the rotator, pinch the belt to form a nip;

a holder holding the nip forming member;

a first stay supporting the holder, the first stay extending in a width direction parallel to the rotation axis;

an urging member urging the first stay toward the rotator;

wherein the first stay includes:

a base portion that has a first end to contact the holder and a second end being located opposite the first end in a particular direction orthogonal to each of the rotation axis and a moving direction of the belt at the nip; and a bend portion integrally formed with the base portion that extends from the second end of the base portion, the bend portion including an upstream wall, the upstream wall extending toward the holder, and wherein the upstream wall includes a first end and a second end, the first end being closer to the holder than the second end in the particular direction, wherein the holder has a first side and a second side, the first side directly contacting the nip forming member, and the second side being opposite the first side in the particular direction, and wherein the first end of the upstream wall is spaced apart from the second side of the holder in the moving direction of the belt at the nip, and is farther from the second side of the holder than the first end of the base portion.

17. The device according to claim 16, wherein the base portion of the first stay extends in a certain direction perpendicular to each of the width direction, wherein the upstream wall of the first stay extends in the certain direction, and wherein the base portion faces the upstream wall.

18. The device according to claim 16, wherein the first stay comprises a metal, and wherein the bend portion includes a portion bent by hemming.

19. The device according to claim 16, wherein the nip forming member includes an upstream pad and a downstream pad, the upstream pad being located upstream of the downstream pad in the moving direction of the belt at the nip, wherein the device has a gap between the upstream pad and the downstream pad, and wherein the first end of the base portion is closer to the downstream pad than the upstream pad.

* * * * *